United States Patent [19]
Ishida

[11] Patent Number: 5,184,213
[45] Date of Patent: Feb. 2, 1993

[54] BINARIZING METHOD FOR COLOR IMAGE USING MODIFIED ERROR DIFFUSION METHOD

[75] Inventor: Roh Ishida, Chiba, Japan
[73] Assignee: Toyo Ink Mfg. Co., Ltd., Tokyo, Japan
[21] Appl. No.: 671,417
[22] Filed: Mar. 19, 1991

Related U.S. Application Data

[63] Continuation-in-part of Ser. No. 583,306, Sep. 14, 1990, abandoned.

[30] Foreign Application Priority Data

Sep. 20, 1989 [JP] Japan ................................ 1-244734
Sep. 19, 1990 [EP] European Pat. Off. ..........................
Sep. 20, 1990 [JP] Japan ................................ 2-250944
Feb. 14, 1991 [JP] Japan ................................ 3-42716
Feb. 14, 1991 [JP] Japan ................................ 3-42718

[51] Int. Cl.⁵ ............................................. H04N 1/46
[52] U.S. Cl. ........................................ 358/75; 358/80; 358/298; 358/458
[58] Field of Search .................... 358/75, 75 IJ, 78, 80, 358/283, 298, 458, 464

[56] References Cited

U.S. PATENT DOCUMENTS

| | | | |
|---|---|---|---|
| 4,626,901 | 12/1986 | Tanioka | 358/298 |
| 4,680,625 | 7/1987 | Shoji et al. | 358/75 |
| 4,692,811 | 9/1987 | Tsuchiya et al. | 358/464 |
| 4,809,063 | 2/1989 | Moriguchi et al. | 358/75 |
| 4,974,067 | 11/1990 | Suzuki et al. | 358/458 |

*Primary Examiner*—Jose L. Couso
*Attorney, Agent, or Firm*—Martin A. Farber

[57] ABSTRACT

The binarizing method uses a diffusion coefficient matrix for error diffusion that has a two dimensional frequency and fixedly corresponds to each pixel of the input image, and error that is produced by comparing the referred input pixel value and threshold value is divided in the proportion of the diffusion coefficients in the sub matrix of the diffusion coefficient matrix and those divided errors are added to pixels neighboring the referred pixel, and the diffusion coefficient matrixes for each color are rotated with mutually different angles in the case of color printing.

15 Claims, 27 Drawing Sheets

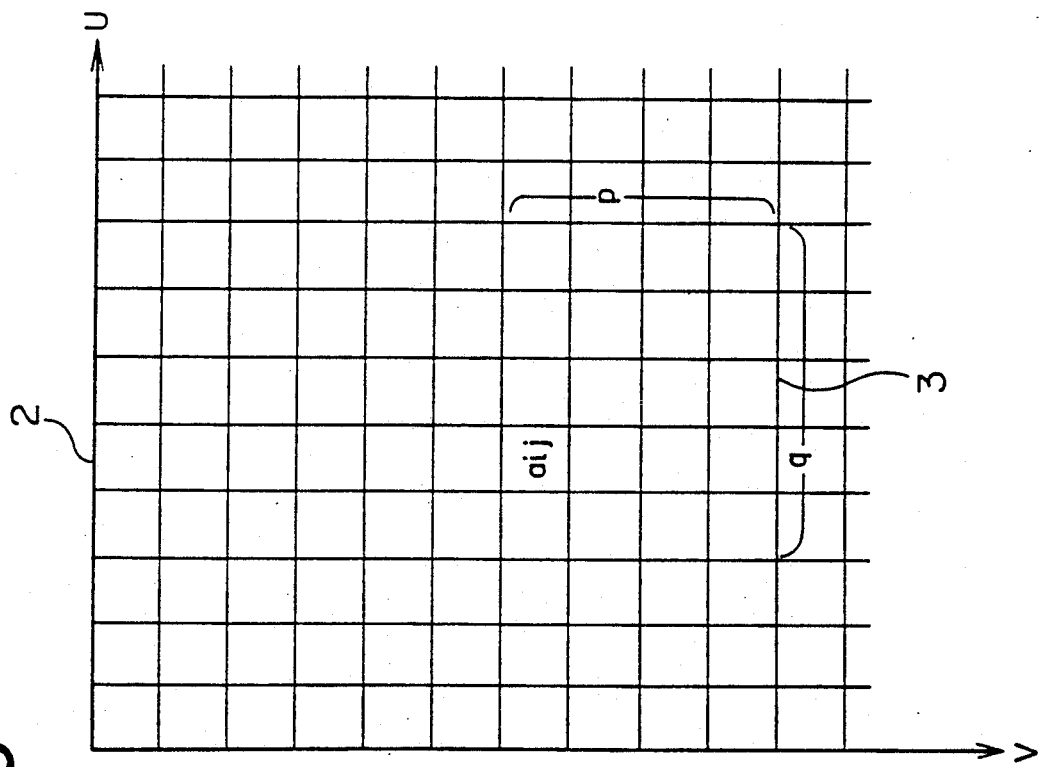
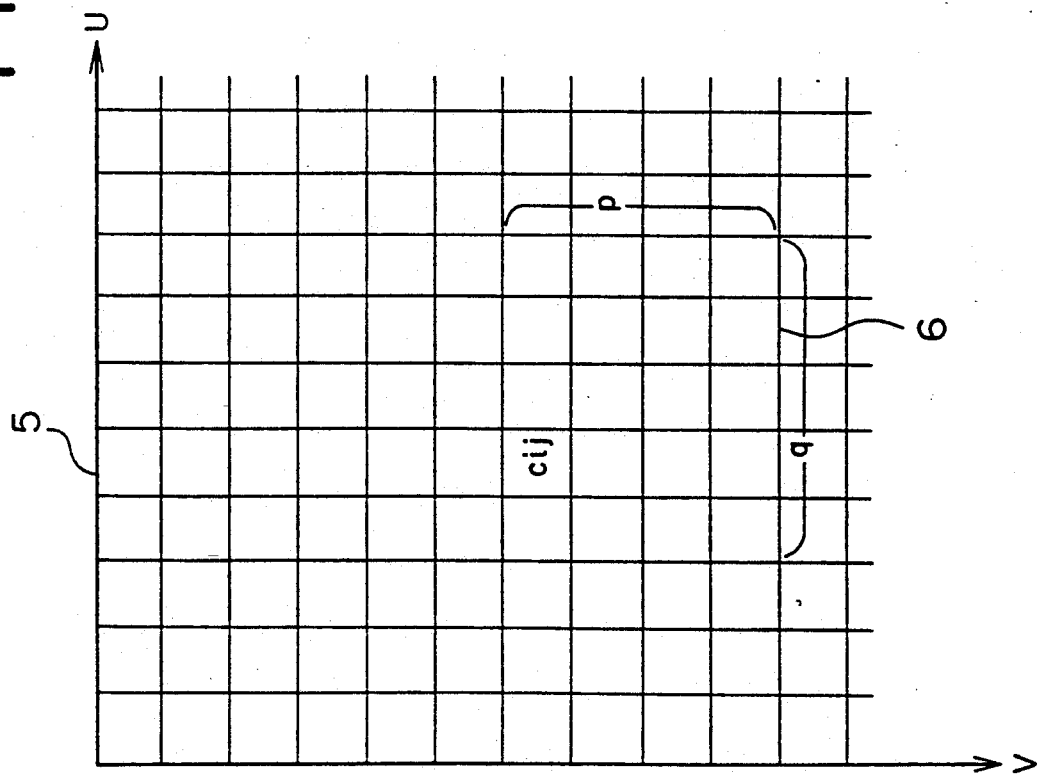
FIG. 3

| | $c_{11}$ | $c_{12}$ | | 5 | | U → |
|---|---|---|---|---|---|---|
| 10 → | 40 | 99 | 70 | 88 | ... |
| $c_{21}$ → | 50 | 23 | 55 | 43 | ... |
| | 12 | 73 | 42 | 69 | ... |
| V ↓ | : | : | : | : | ... |

| | $a_{11}$ | $a_{12}$ | $a_{13}$ | | 2 |
|---|---|---|---|---|---|
| | 3 | 3 | 3 | 3 | 3 |
| $a_{21}$ → | 3 | 4 | 4 | 4 | 3 |
| $a_{22}$ → | 3 | 4 | 5 | 4 | 3 |
| | 3 | 4 | 4 | 4 | 3 |
| | 3 | 3 | 3 | 3 | 3 |

| | | | | U → |
|---|---|---|---|---|
| 40 | 111 | 70 | 88 | ... |
| 62 | 39 | 55 | 43 | ... |
| 12 | 73 | 42 | 69 | ... |
| V ↓ : | : | : | : | ... |

| | | | | U → |
|---|---|---|---|---|
| 40 | 111 | 73 | 88 | ... |
| 62 | 43 | 59 | 43 | ... |
| 12 | 73 | 42 | 69 | ... |
| V ↓ : | : | : | : | ... |

| 60 | 52 | 40 | 24 | 32 | 51 | 59 | 63 |
|----|----|----|----|----|----|----|----|
| 56 | 44 | 28 | 12 | 20 | 39 | 47 | 55 |
| 48 | 36 | 16 | 4  | 8  | 19 | 31 | 43 |
| 33 | 21 | 11 | 0  | 3  | 6  | 15 | 27 |
| 25 | 13 | 7  | 1  | 2  | 10 | 23 | 35 |
| 41 | 29 | 17 | 9  | 5  | 18 | 38 | 50 |
| 53 | 45 | 37 | 22 | 14 | 30 | 46 | 58 |
| 61 | 57 | 49 | 34 | 26 | 42 | 54 | 62 |

| | | 7 |
|---|---|---|
| 3 | 5 | 1 |

FIG. 16
| CYAN | 17.5° |
|---|---|
| MAGENTA | 77.5° |
| YELLOW | 2.5° |
| BLACK | 47.5° |
FIG. 17
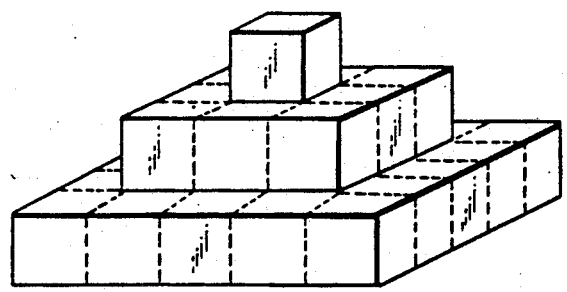
FIG. 18
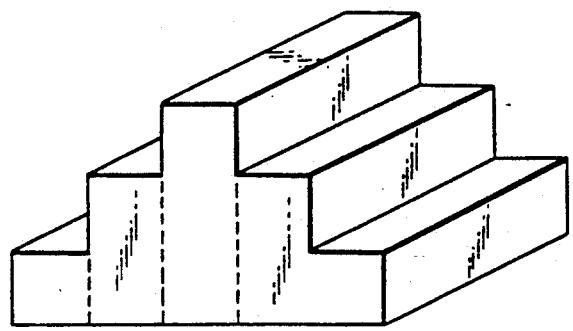

| RANGE OF ERROR VALUE | PARTIAL MATRIX |
|---|---|
| 0 ~ 49 | 2 ROWS × 2 COLUMNS |
| 50 OR MORE | 3 ROWS × 3 COLUMNS |
FIG. 22
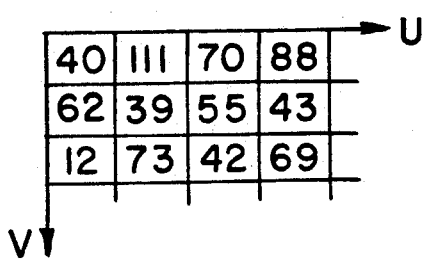
FIG. 23
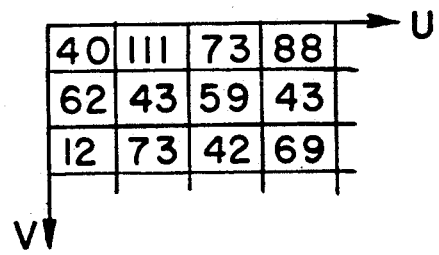
FIG. 24

| RANGE OF ERROR VALUE | PARTIAL MATRIX | |
|---|---|---|
| 0 ~ 63 | 2 ROWS × 2 COLUMNS | 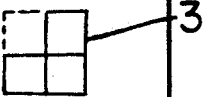 3 |
| 64 ~ 127 | 3 ROWS × 3 COLUMNS | 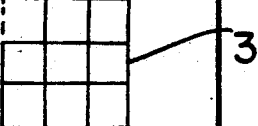 3 |
| 128 OR MORE | 4 ROWS × 4 COLUMNS | 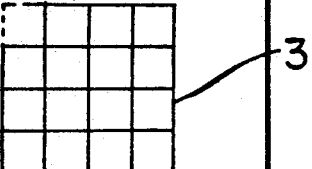 3 |
FIG. 26

| GRADATION VALUE OF INPUT DATA (%) | OUTPUT DOTS % (%) ||
|---|---|---|
| | SIZE VARIABLE PARTIAL MATRIX | SIZE INVARIABLE PARTIAL MATRIX |
| 10 | 7.74 | 7.24 |
| 20 | 17.61 | 17.27 |
| 30 | 27.81 | 27.25 |
| 40 | 37.61 | 37.24 |
| 50 | 47.87 | 47.36 |
| 60 | 58.20 | 57.39 |
| 70 | 68.53 | 67.40 |
| 80 | 78.89 | 77.40 |
| 90 | 89.22 | 87.38 |
| 100 | 99.56 | 97.51 |

FIG. 29

| 60 | 52 | 40 | 24 | 32 | 51 | 59 | 63 |
|----|----|----|----|----|----|----|----|
| 56 | 44 | 28 | 12 | 20 | 39 | 47 | 55 |
| 48 | 36 | 16 | 4  | 8  | 19 | 31 | 43 |
| 33 | 21 | 11 | 0  | 3  | 6  | 15 | 27 |
| 25 | 13 | 7  | 1  | 2  | 10 | 23 | 35 |
| 41 | 29 | 17 | 9  | 5  | 18 | 38 | 50 |
| 53 | 45 | 37 | 22 | 14 | 30 | 46 | 58 |
| 61 | 57 | 49 | 34 | 26 | 42 | 54 | 62 |

FIG. 39

BINARIZING METHOD FOR COLOR IMAGE USING MODIFIED ERROR DIFFUSION METHOD

RELATED APPLICATION

This application is a continuation-in-part of my co-pending application Ser. No. 07/583,306 filed Sep. 14, 1990 now abandoned.

BACKGROUND OF THE INVENTION

1. Field of the Invention

The present invention relates to a method to binarize a multivalued halftone image, and in particular to a method for binarization when digital multivalued color halftone image as ready by scanner is reproduced by a color output device, which can output binary values.

2. Technical Background

In the field of image processing, ordered dither method or error diffusion method are generally known as the technique to binarize a multivalued color image for tone reproduction.

Ordered dither method is a binarization technique, by which one pixel of input signal as read from an original of multivalued image corresponds to one pixel of the binarized image and the input signal is compared with the threshold table having periodicity fixedly corresponding to each position of an input pixel to determine whether "to output" or "not to output".

The error diffusion method is a binarization technique, by which the error in binarizing one pixel of multivalued image is dispersed and added to the surrounding input pixels according to the size of the coefficient of the relatively fixed coefficient matrix at the site where error occurred.

On the other hand, a method is known in the field of printing, by which color film is used as input medium and is separated into colors, periodic dots are prepared on black-and-white films by optical method using contact screen, printing blocks are prepared using these films, and color image is reproduced as dot image. In case of dot image, the size of dot represents the density of the image. Further, a method is known, by which the contact screen is rotated at different angle for each color, and moiré and color difference due to the registering miss on each color is reduced.

Also, another method has been developed to prepare dots electronically without using optical screen, and this has been furnished in the scanner for printing or plotter system in recent years.

EVALUATION OF BACKGROUND TECHNIQUE

However, the dither method is disadvantageous in that the pattern peculiar to the structure of threshold table is generated, that it is not perfect in the reproducibility of gradation, and that moiré and color difference occur due to registering miss.

The error diffusion method has the problems in that peculiar snaky pattern appears on processed image, that there are problems to be solved in the image quality, and that it is still poor in gradation reproducibility.

The object of the present invention is to offer a color image information processing method, by which it is possible to provide perfect gradation reproducibility and to give the processed image with high image quality without threshold table.

DISCLOSURE OF THE INVENTION

To attain the above objects, the first method for color image information processing to reproduce multivalued color halftone image information by an output device capable of recording in binary values according to this invention is characterized in that, when the object value that is a density value of a referred input pixel of a color image or the sum of the density value and the error values is binarized through comparison with the threshold, the difference between said object value and the threshold is divided into said error values in the size proportional to the coefficients in a partial matrix of the diffusion coefficient matrix having periodicity in 1-dimensional or 2-dimensional direction consisting of the elements fixedly corresponding to each position of input pixel, and said error values are added to the object values of the other input pixels distributed and fixedly corresponding to the position of referred input pixel.

The second color image information processing method according to this invention is characterized in that said diffusion coefficient matrix is rotated at a different angle for each color in the first color image information processing method.

The third color image information processing method according this invention is characterized in that said diffusion coefficient matrix rotated at a different angle for each color is stored in the memory in the second color image information processing method.

The fourth color image information processing method according this invention is characterized in that, when the object value that is a density value of the referred input pixel of color image or the sum of the density value and the error values are binarized through comparison with the threshold, the difference between said object value and the threshold is divided into said error values in the size proportional to the coefficients in a partial matrix of the diffusion coefficient matrix having periodicity in 1-dimensional or 2-dimensional direction consisting of each elements fixedly corresponding to the position of the input pixel, and said error valves are added to the object values of the other input pixels distributed and fixedly corresponding to the position of said referred input pixel, and the size of rows and/or columns of said partial matrix is varied correspondingly to the size of said error value.

The fifth color image information processing method to reproduce multivalued color image information by an output device capable of recording in binary values according to this invention is characterized in that, when the object value that is a density value of referred input pixel of color image or the sum of the density value and products of coefficients which are elements of ratio coefficient matrix calculated from diffusion coefficient matrix having periodicity in 1-dimensional or 2-dimensional direction consisting of the elements fixedly corresponding to each position of input pixel, and error values which are elements of an error value matrix fixedly corresponding to each position of the input pixel is binarized through comparison with the threshold, the difference between said object value and the threshold is stored as an element of the error value matrix corresponding to the position of referred input pixel.

The sixth color image information processing method according to this invention is characterized in that said diffusion coefficient matrix is rotated at a different angle for each color in the fifth color image information processing method.

The seventh color image information processing method according to this invention is characterized in that said ratio coefficient matrix calculated from the diffusion coefficient matrix rotated at a different angle for each color is stored in the memory in the fifth color image information processing method.

EFFECT OF THE INVENTION

First, diffusion coefficient matrix is prepared. Each of the elements of diffusion coefficient matrix fixedly corresponds to each position of the input pixels of a color image respectively. The diffusion coefficient matrix has the period with length of m in the direction of row and the period with length of n in the direction of column. The input pixel that is an object for image processing is called a referred pixel. It is assumed that there is a partial matrix of p rows and q columns in this diffusion coefficient matrix. A predetermined position of an element of the uppermost row of this partial matrix corresponds to the referred pixel. The size of m, p, n and q are variable corresponding to the size of the error value or constant.

The object value that is an input signal from input pixel is binarized by the threshold, and the difference between the object value and the threshold is divided by the predetermined ratio and is accumulated in the object values of the subsequent input pixels. The predetermined ratio in this case is determined in proportion to the coefficient. The coefficient is either coefficient of the element of the partial matrix of the diffusion coefficient matrix fixedly corresponding to the input pixel or coefficient of the element of the ratio diffusion coefficient matrix derived from said coefficient matrix.

When this procedure is performed by scanning on all pixels of color image, binary image of monochromatic image of the color image is obtained. In each color, diffusion coefficient matrix is rotated at a different angle for each color, and the above processing is performed.

It is possible according to this invention to offer a method for color image information processing to obtain the processed image with high quality and high gradation reproducibility without using threshold table.

EMBODIMENTS

In the following, the features and other details of this invention will be described in connection with the drawings.

BRIEF DESCRIPTION OF THE DRAWINGS

FIG. 3 is a graphic representation of a partial matrix in the diffusion coefficient matrix;

FIG. 10 is a diagram to show an input value matrix for multivalued image;

FIG. 11 represents another example of the diffusion coefficient matrix;

FIG. 16 is a table to show the rotating angles of the diffusion coefficient matrix for each color;

FIG. 17 is a perspective view of another example of the distribution of the coefficient size of the element in the diffusion coefficient matrix; and FIG. 18 is a perspective view of another example of the distribution of the coefficient size of the element in the diffusion coefficient matrix.

FIG. 22 shows the partial matrix of the diffusion coefficient matrix;

FIG. 23 is a diagram to show the matrix of the object value after said divided errors are added;

FIG. 24 is a diagram to show another matrix of the object value after said divided errors are added;

FIG. 26 is a diagram to show the partial matrix which size is variable;

FIG. 29 is a diagram to show a ratio (%) of the output dots of a binary image;

FIG. 39 represents another example of the diffusion coefficient matrix;

DESCRIPTION OF THE EMBODIMENTS

First, the first invention is described.

Figure 1:
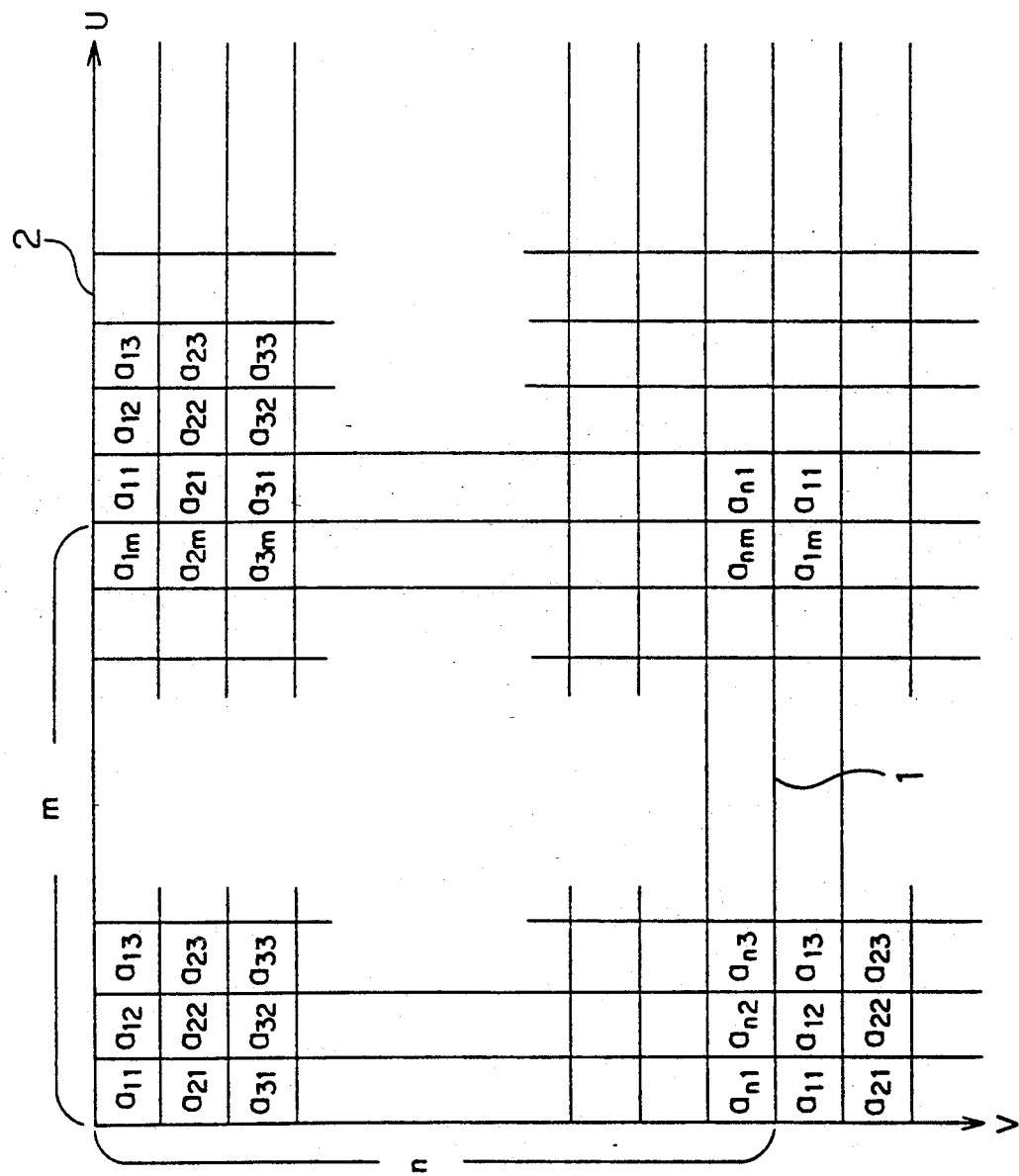
FIG. 1 is a diagram to show diffusion coefficient matrix.
Figure 2:
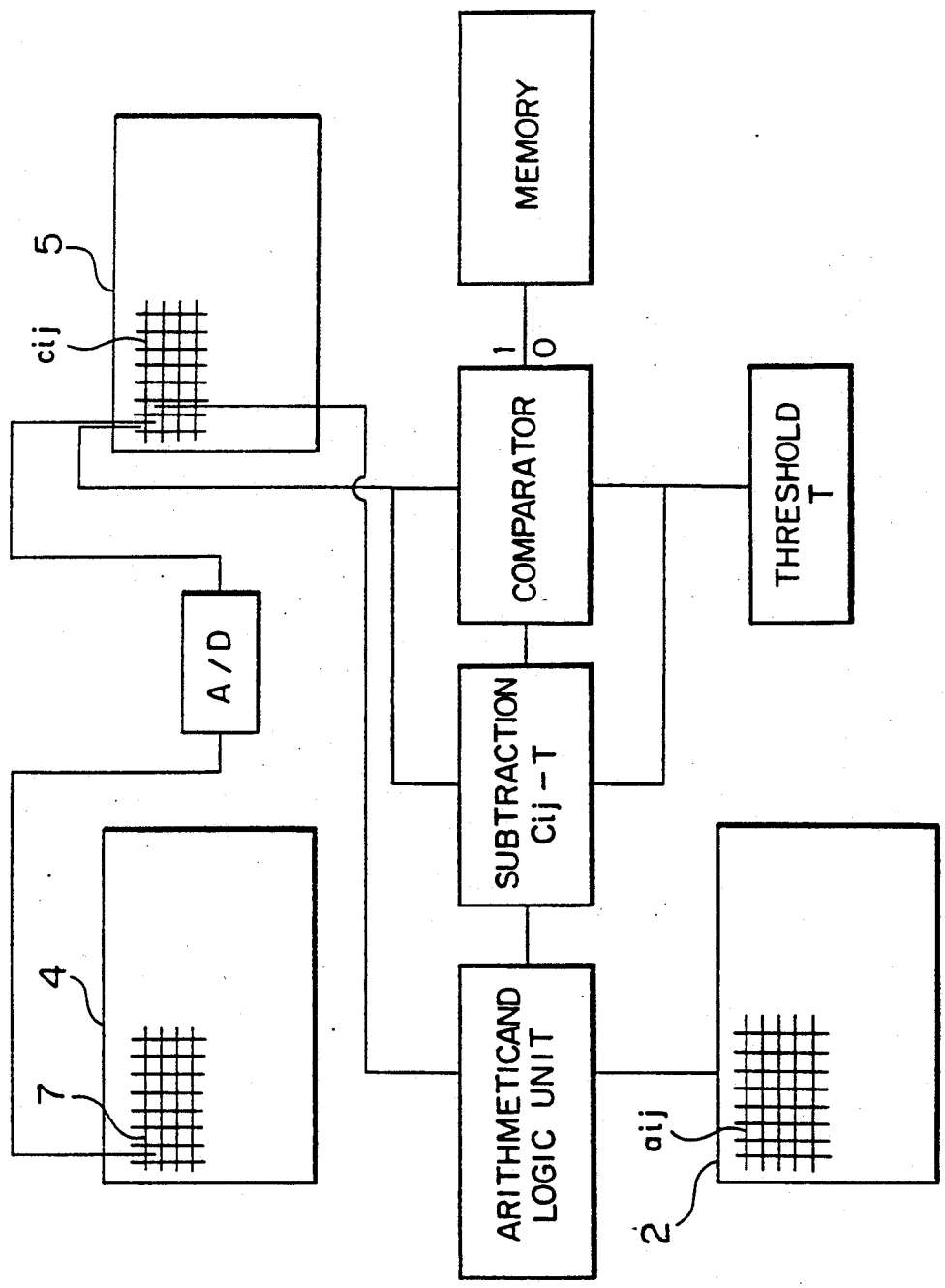
FIG. 2 is a diagram to explain the process of the image processing.

In FIG. 1, the numeral 2 represents the diffusion coefficient matrix, and the diffusion coefficient matrix 2 has the period with length m in the direction of U-axis and the period with length n in the direction of V-axis. The coefficients $a_{1,1} \ldots a_{n,m}$ in the number of n·m are included in one 2-dimensional period. The elements in the diffusion coefficient matrix 2 fixedly correspond to the each position of input pixel 7 in multivalued color image 4 (FIG. 2).

Namely, 2 is the diffusion coefficient matrix in FIG. 3, and 3 represents the partial matrix of p rows and q columns of the diffusion coefficient matrix 2. The element $a_{i,j}$ of the diffusion coefficient matrix 2 corresponds to the element $c_{i,j}$ of the matrix 5 of the object value in the inputted multivalued color image 4. Because the diffusion coefficient matrix 2 has periodicity, the value of $a_{i,j}$ is equal to the value of $a_{i \bmod m, j \bmod n}$. For example, if the periods m=4 and n=3, the value of $a_{3,2}$ is equal to the value of $a_{11,8}$ because $a_{11,8} = a_{11 \bmod 4, 8 \bmod 3} = a_{3,2}$. The element $c_{ij}$ of the matrix 5 of the object value fixedly corresponds to the position of the input pixel 7 of color image 4. Here, the object value given in the element $c_{ij}$ of the matrix 5 consist in input value as a factor is the input value of the input pixel 7 of color image 4, or the input value added with the error value accumratively.

If U is the main scanning direction of the processing and V is the secondary scanning direction, in case $c_{ij} \geq T$, the binarized signal is turned "to output" when the value of $c_{i,j}$ is binarized in comparison with the threshold T. Thus, the error of $e = c_{i,j} - T$ is generated. In case $c_{i,j} > T$, the binarized signal is turned to "not to output", and the error $e = c_{i,j}$ is generated.

This error e is dispersed and added to each element of the partial matrix 6 of p rows and q columns of the object value matrix 5 of the input pixel, corresponding to the range of the partial matrix 3 of p rows and q columns of the diffusion coefficient matrix 2 including $a_{i,j}$ in proportion to the coefficient $a_{w,z}$ (except $a_{i,k}$ with $k \leq j$, of the values where w is changed by taking a natural number from i to $i+p-1$, and z is changed to each value of w by setting the natural number $\alpha$ which is lower than q and by taking natural number from $j-\alpha+1$ to $j-\alpha+q$.) For example, in FIG. 32, the hatched range is the range of $a_{w,z}$ that corresponds to the range of the object value matrix for dispersing of the error.

By performing this processing to all input pixels by moving the referred pixel in the order of main scanning and the secondary scanning, the image in binary values can be obtained. There is no specific relation between p, q and n, m.

Figures 4, 5, 6, 7, 8:
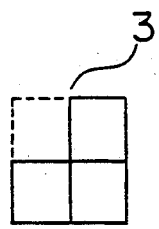
FIG. 4 is a diagram of an example of matrix of object value.
FIG. 5 shows another example of the diffusion coefficient matrix.
FIG. 6 shows a partial matrix of diffusion coefficient matrix.
FIG. 7 is a diagram to show matrix of an object value after the divided errors are added.
FIG. 8 is a diagram to show the matrix of the object value after the divided errors are added further.

Next, the process to diffuse the error by the above processing is described in connection with the diagrams as an example. However, the claims of the present invention are not limited to the size of matrix and numerical values used in this description. In FIG. 4, 5 represents the matrix of the object value of the inputted multivalued color image, and it is the matrix of the input value of the pixel of a color image before the errors are added and the numeral 10 denotes the site where occur occurred (referred pixel). As shown in FIG. 5, it is supposed that the diffusion coefficient matrix 2 is a coefficient matrix of 5 rows and 5 columns, and the partial matrix 3 is the matrix with 2 rows and 2 columns as shown in FIG. 6. It is supposed that the range of the input pixel value is 0−100, and that the threshold is 100. Then, the value of $c_{1,1}$ of the object value matrix 5 is 40 and is smaller than the threshold. Thus, the binarized signal is turned to "not to output", the error is 40. To the matrix elements $c_{1,2}$, $c_{2,1}$ and $c_{2,2}$ of the input pixels corresponding to the error diffusion range of $a_{1,2}$, $a_{2,1}$ and $a_{2,2}$, $a_{1,2} = 12$ ($=40 \times 3/(3+3+4)$), $c_{2,1} = 12$ ($=40 \times 3/(3+3+4)$), and $e_{2,2} = 16$ ($=40 \times 4/(3+3+4)$) are added respectively. As the result, the matrix 5 of the object value of the input multivalued color image is as given in FIG. 7. The value of the input pixel $a_{1,2}$ to be processed subsequently is 111 as shown in FIG. 7 and is bigger than the threshold. Thus, the binarized signal is turned to "to output", and 11 is the error. To the input elements $c_{1,3}$, $c_{2,2}$ and $c_{2,3}$ corresponding to the error diffusion ranges $a_{1,3}$, $a_{2,2}$ and $a_{2,3}$, the new error fragments $e_{1,3} = 3$ ($11 \times 3/(3+4+4)$) $e_{2,2} = 4$ ($=11 \times 4/(3+4+4)$), and $e_{2,3} = 4$ ($=11 \times 4/(3+4+4)$) are added respectively. As the result, the matrix of the object multivalued color image is an given in FIG. 8. The same processing is performed to all input pixels in the order of main scanning and the secondary scanning, and the processing for one frame is completed.

Next, description is given on the second invention.

Figure 9:
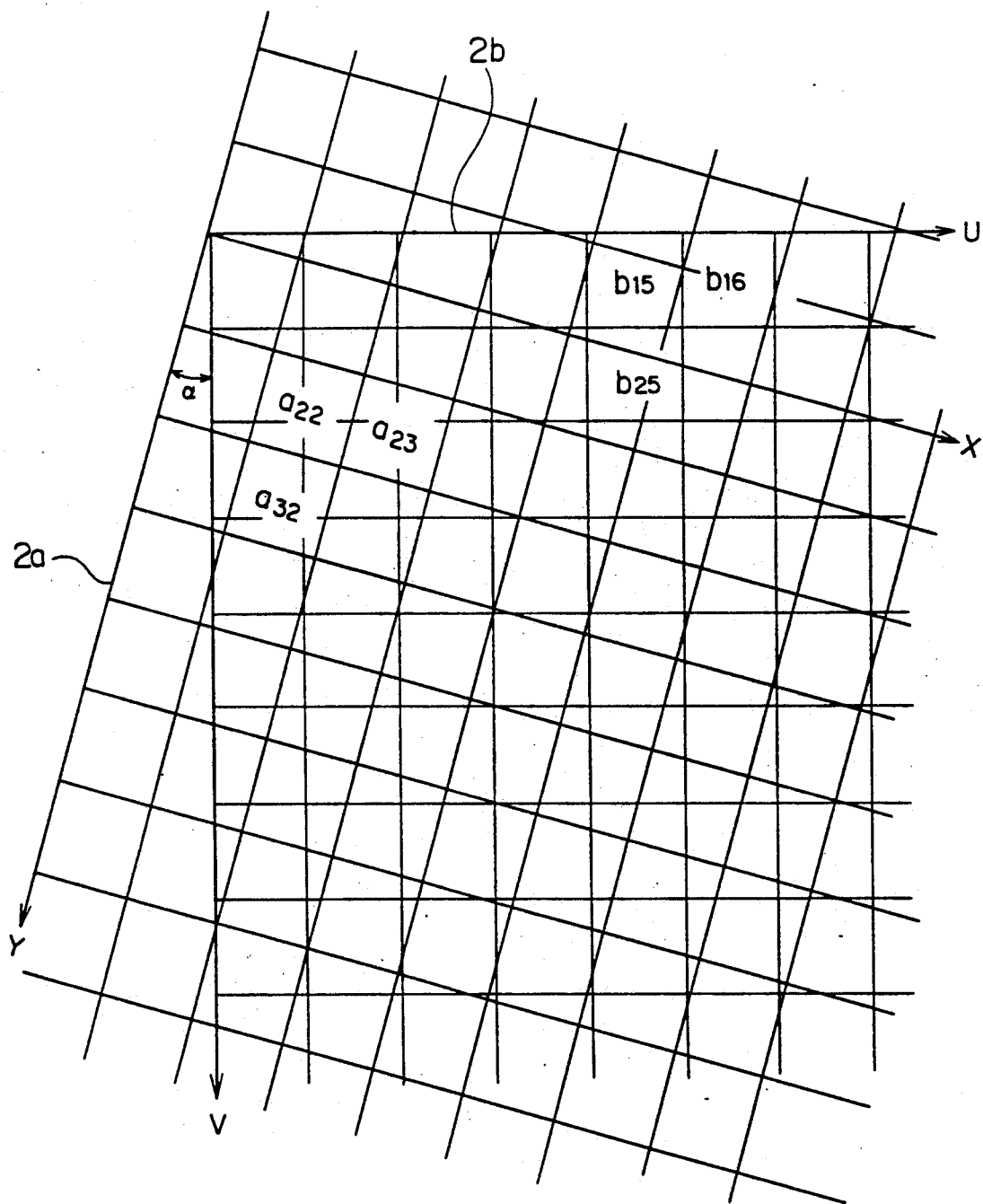
FIG. 9 is a diagram of the rotated diffusion coefficient matrix.

In FIG. 9, the diffusion coefficient matrix 2a is obtained by rotating said diffusion coefficient matrix 2 by the angle A, and 2b represents the diffusion coefficient matrix having the element $b_{i,j}$ corresponding to the element $c_{i,j}$ of the matrix 5 of the object value of multivalued input pixel of the color image. The value of $b_{i,j}$ is equal to the value of $a_{r,l}$, and the following relationship exists:

$r = [i \cdot \cos(A) - j \cdot \sin(A)] \bmod m.$ $l = [i \cdot \sin(A) + j \cdot \cos(A)] \bmod n.$ Here, [ ] indicates rounding process.

When the same processing as in the description of the first invention is performed using the diffusion coefficient matrix 2b rotating at different angles for each color instead of the diffusion coefficient matrix 2, the image in binary values with less moiré and color difference due to the registering miss at output can be obtained.

EXPERIMENTAL EXAMPLES OF THE FIRST INVENTION

In the following, the method according to this invention will be described in connection with experimental examples, whereas the present invention is not limited to the numeral values in the experimental examples.

EXPERIMENTAL EXAMPLE 1 OF THE FIRST INVENTION

Figure 10:
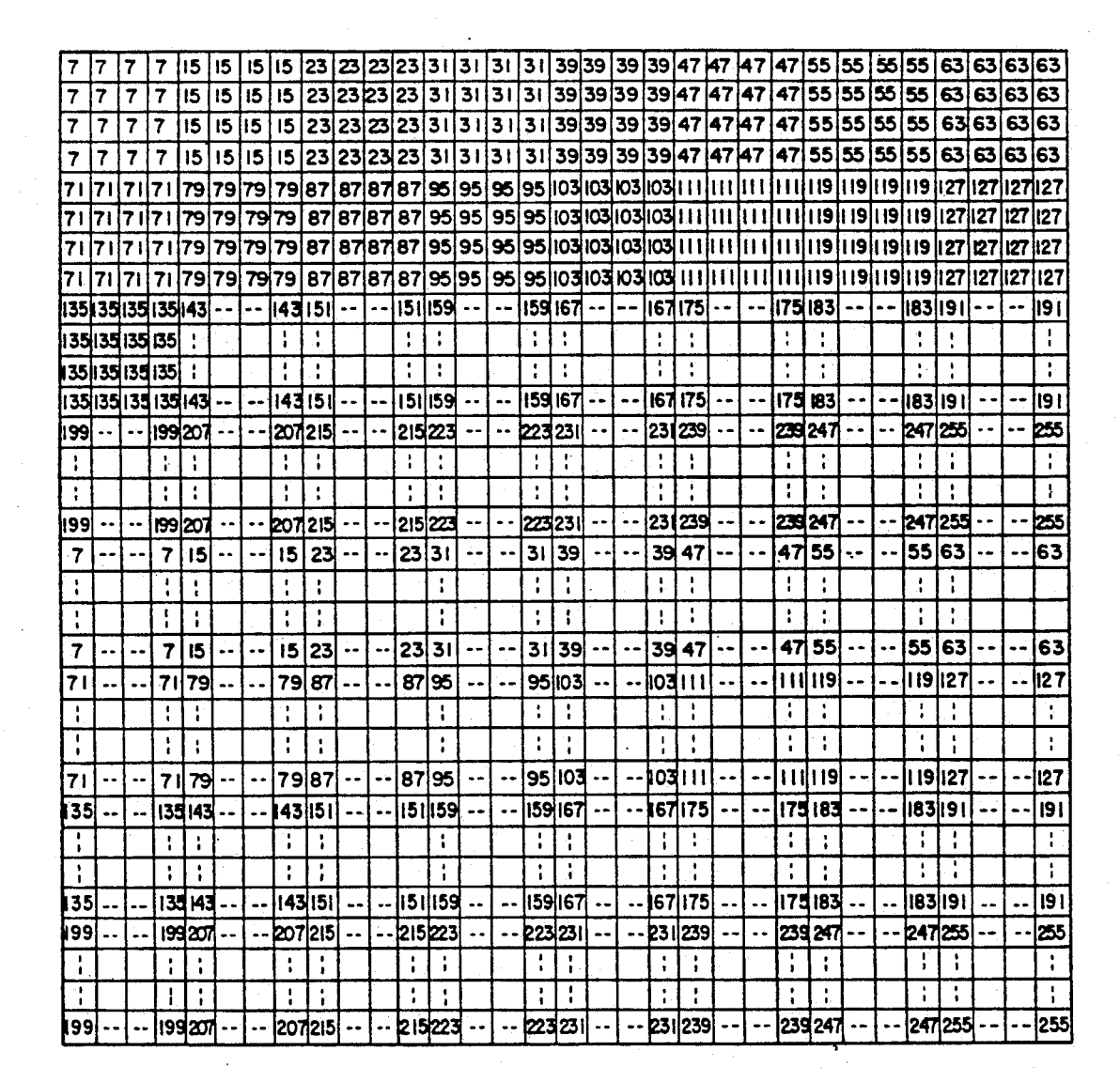
Figure 12:
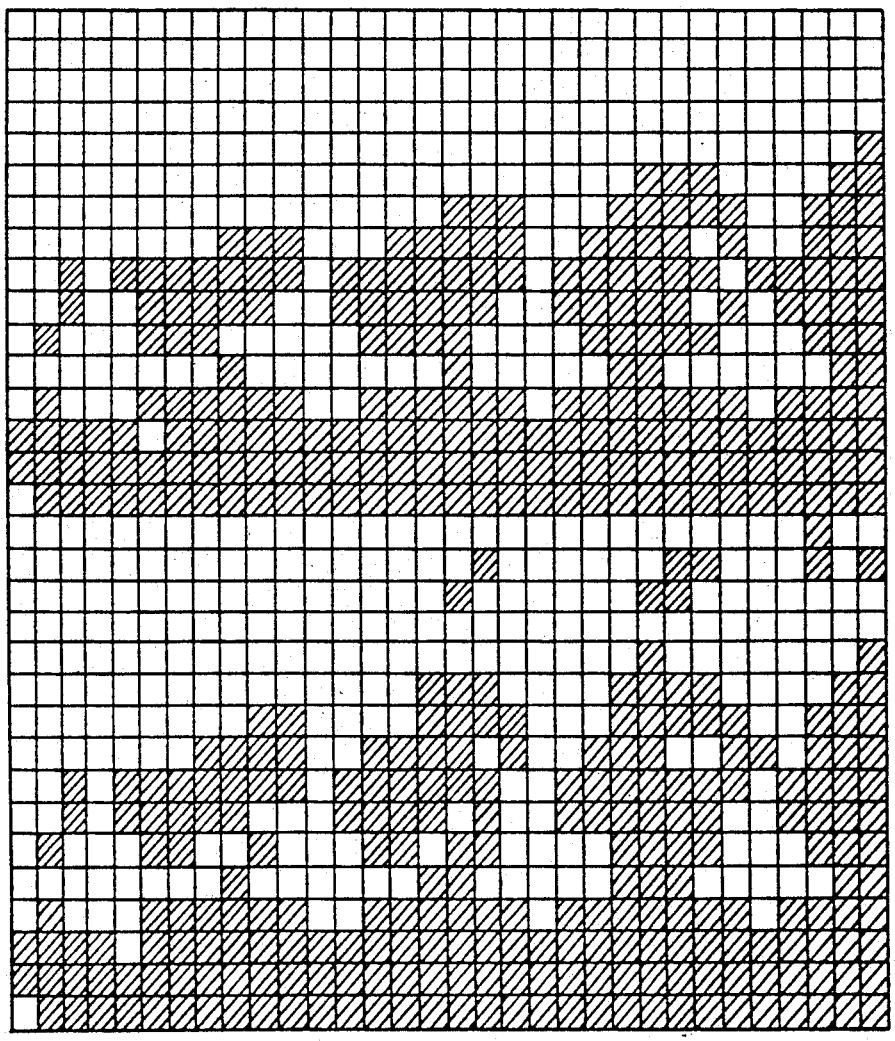
FIG. 12 is a diagram to show an output image according to the processing method of this invention.

With FIG. 10 as the multivalued information of the input taking the values within the range of 0–255, with the threshold at 255, with FIG. 11 as the diffusion coefficient matrix, with the size of partial matrix of 4×4 and rotating angle of 0°, the binary image of FIG. 12 was obtained.

Figures 13, 14:
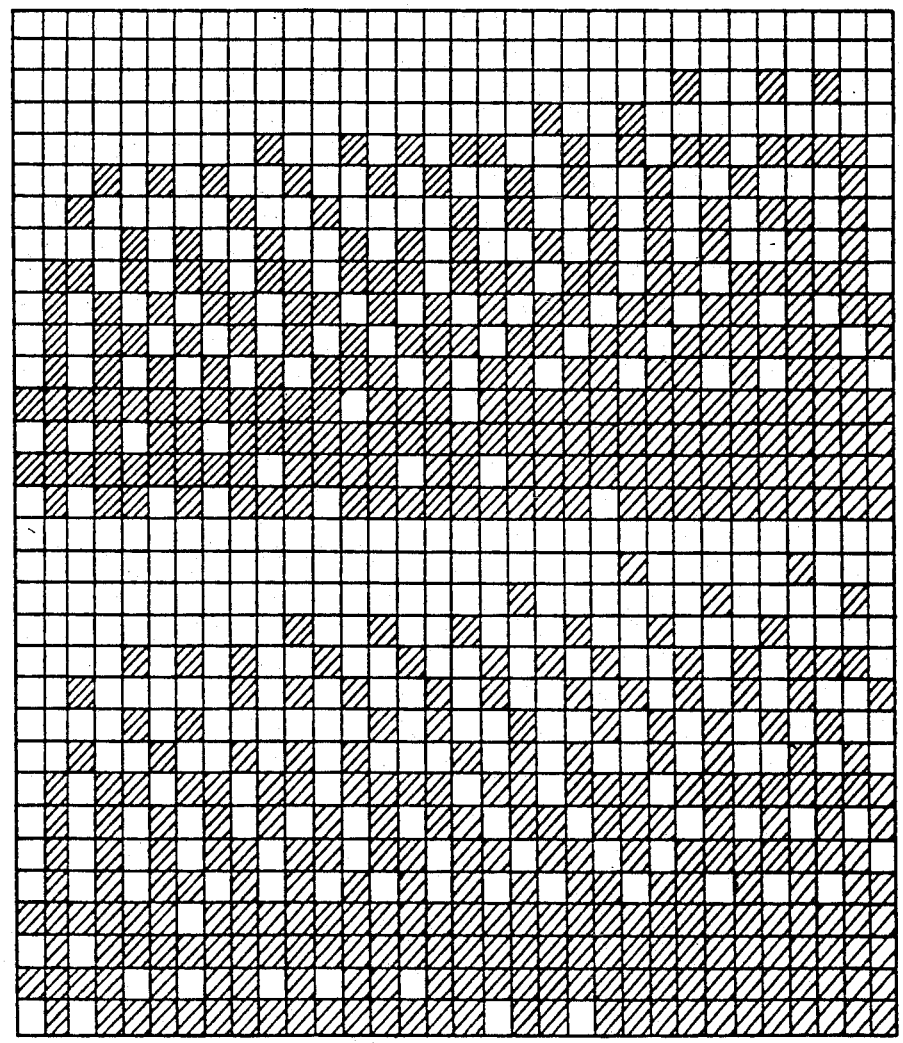
FIG. 13 is a diagram to represent an error diffusion coefficient table.
FIG. 14 is a diagram to show an output image according to the error diffusion method.

On the other hand, the image was reproduced through binarization according to the error diffusion method, using the same input data and the diffusion coefficient table of FIG. 13. The result is given in FIG. 14. As it is evident from the figure, the shape similar to dots can be obtained by the method of this invention.

EXPERIMENTAL INVENTION

Figure 15:
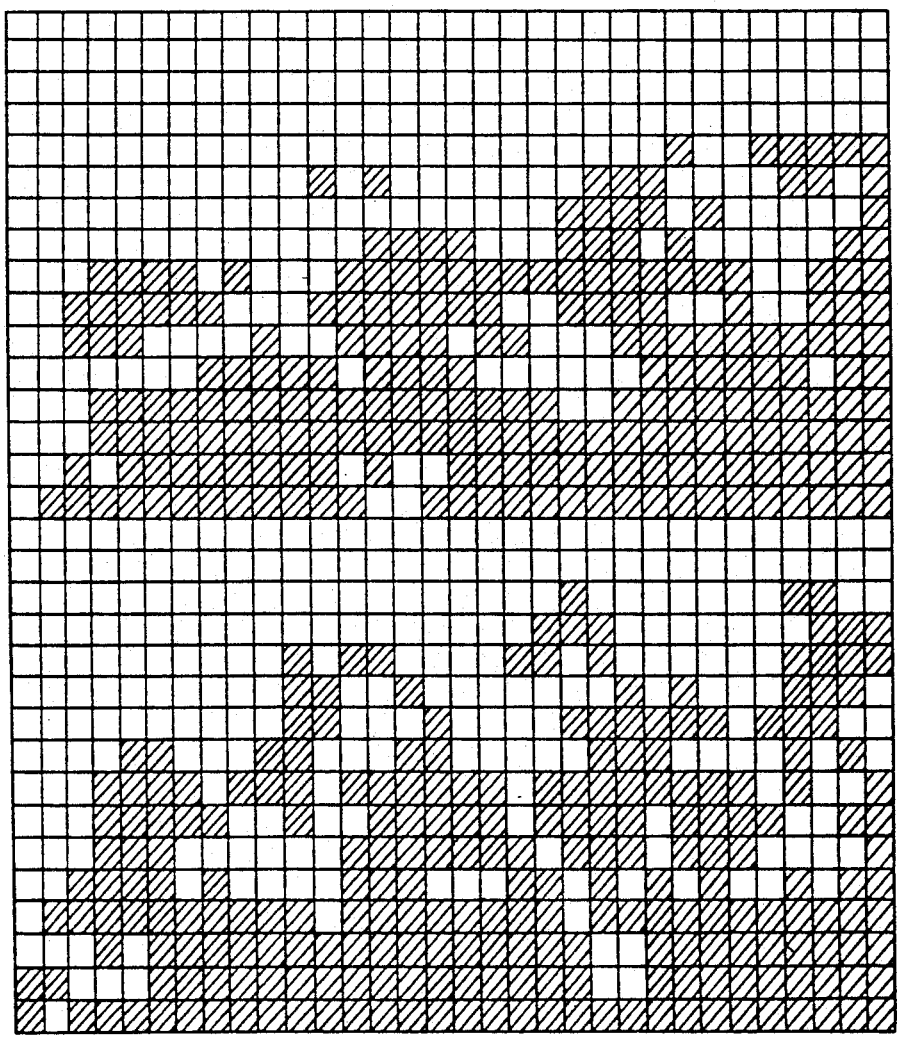
FIG. 15 is an output diagram to represent another output image according to this invention.

With FIG. 10 as the multivalued information of the input taking the values within the range of 0–255, with the threshold at 255, with FIG. 11 as the diffusion coefficient matrix, with the size of partial matrix of 4×4 and rotating angle of 30°, the binary image of FIG. 15 was obtained. It is also evident in this figure that the shape similar to dots can be obtained.

EXPERIMENTAL EXAMPLE 3 OF THE FIRST INVENTION

A transparent original was inputted using a scanner for prepress (Dainippon Screen Co., Ltd.,; SG-818), and binarization processing was performed by personal computer PC-9801 (NEC). The four binary value images were outputted on black-and-white films by a laser plotter (Scitex), and a color image was reproduced by a proof press (DuPont). The results were approximately the same as that of the conventional type printing. In this case, the diffusion coefficient matrix was the same as given in FIG. 11, and the size of partial matrix was 4×4. The diffusion coefficient matrix was rotated by the angle of FIG. 16 for each color.

As the result, a binary value image with less moiré and color difference due to registering miss was obtained.

It is possible according to the present invention to obtain a method for color image information processing, which can provide high tone reproducibility and to give the processed image with excellent image quality without using threshold table.

In case that the 2-dimensional diffusion coefficient matrix having a period n·m of this invention is formed into pyramid shape, where the values in central part are larger than those in the surrounding as given in FIG. 17, the binary value image like dots having the period similar to that of conventional type printing process using contact screen could be obtained. With the coefficient like roof as given in FIG. 18 the effect similar to that of the printing using single-lined screen was obtained, and both moiré and color difference were extremely decreased.

Next, the third invention is described.

It is possible to accelerate binarization memorising in a memory and using the diffusion coefficient matrix rotated in the same manner as the second invention previously in advance of binarization.

Particularly, the rotated diffusion coefficient matrix that has $\sqrt{\delta^2+\gamma^2}\cdot f$ elements in each side and can be repeated seamlessly can be formed by selecting $\theta$ than $\tan\theta = \delta/\gamma$ (rational number). This diffusion coefficient matrix can result in reduction of a storage region in a memory. f is least common multiple number of elements number n and m of vertical and horizontal axis of the diffusion coefficient matrix.

Figures 19, 20, 21:
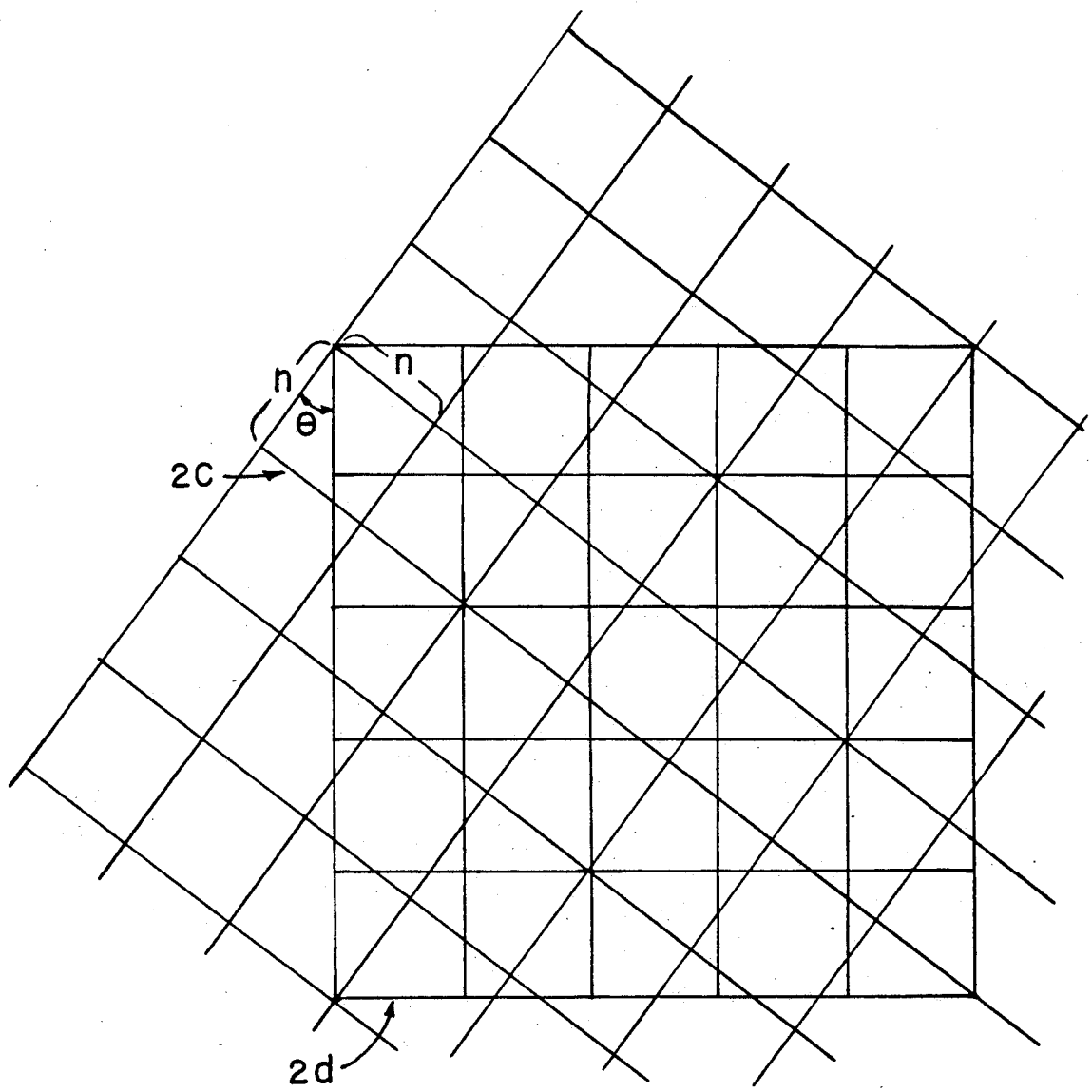
FIG. 19 is the diffusion coefficient matrix rotated in the rotating angle $\theta$ that tan $\theta$ belongs to a rational number.
FIG. 20 is a diagram of an example of the matrix of the object value.
FIG. 21 shows another example of the diffusion coefficient matrix.

In FIG. 19, 2c designates a unit of the diffusion coefficient matrix having n×n elements and 2d designates the coefficient matrix rotated in angle $\theta$ than $\tan\theta = \frac{3}{4}$ as an example.

The rotated diffusion coefficient matrix has $\sqrt{3^2+4^2}$ n=5n elements in each side and can be repeated in vertical and horizontal direction.

Next, the fourth invention is described. In the same manner of the first invention, the error e is dispersed and added to each element of partial matrix 6 of p rows and q columns of the object value matrix 5 of input pixel, corresponding to the range of the partial matrix 3 of p rows and q columns of the diffusion coefficient matrix 2 including $a_{i,j}$ in proportion to the coefficient $a_{w,z}$ (except $a_{i,k}$ with $k \leq j$), of the values where w is changed by taking natural number from i to $i+p-1$, and z is changed to each value of w by setting the natural number $\alpha$ which is lower than q and by taking natural number from $j-\alpha+1$ to $j-\alpha+q$). These p and q is varied corresponding to the size of the error value.

By performing this processing to all input pixels by moving the referred pixel in the order of main scanning and the sub scanning, the image in binary values can be obtained. There is no specific relation between p, q and n, m.

Next, the process to diffuse the error by the above processing is described in connection with the diagrams as an example. However, the claims of the present invention are not limited to the size of the matrix and numerical values used in this description. In FIG. 20, 5 represents the matrix of the object value of inputted multivalued color image, and it is the matrix of the input value of the pixel of color image before the errors are added and the numeral 10 denotes the site where error occurred (referred pixel). As shown in FIG. 21, it is supposed that the diffusion coefficient matrix 2 is a coefficient matrix of 5 rows and 5 columns, and the size of the partial matrix 3 is determined corresponding to the range of error value as shown in FIG. 22. It is supposed that the range of the input pixel value is 0–100, and that the threshold is 100. Then, the value of $c_{1,1}$ of the object value matrix 5 is 42 and is smaller than the threshold. Thus, the binarized signal is turned to "not to output", the error is 42. Thus, the size of the partial matrix 2×2 is selected. To the matrix elements $c_{1,2}$, $c_{2,1}$ and $c_{2,2}$ of the input pixels corresponding to the error diffusion range of $a_{1,2}$, $a_{2,1}$ and $a_{2,2}$, $e_{1,2}=12$ ($=42\times3/(3+3+4)$), $e_{2,1}=12$ ($=42\times3/(3+3+4)$), and $e_{2,2}=16$ ($=42\times4/(3+3+4)$) are added respectively. As the result, the matrix 5 of the object value of the input multivalued color image is as given in FIG. 23. The value of the input pixel $a_{1,2}$ to be processed subsequently is 111 and is bigger than the threshold. Thus, the binarized signal is turned to "to output", and 11 is the error. Thus, size of the partial matrix 2×2 is selected. To the input elements $c_{1,3}$, $c_{2,2}$ and $c_{2,3}$ corresponding to the error diffusion ranges $a_{1,3}$, $a_{2,2}$, and $a_{2,3}$, the new error fragments $e_{1,3}=3$ ($11\times3/(3+4+4)$) $e_{2,2}=4$ ($=11\times4/(3+4+4)$), and $e_{2,3}=4$ ($=11\times4/(3+4+4)$) are added respectively. As the result, the matrix of the input multivalues color image is as given in FIG. 24. The same processing is performed to all input pixels by moving the referred pixel in the order of main scanning and the sub scanning, and the processing for one frame is completed.

In the case said above, though the first error value at the site where error occurred equal 42 and the sum of error fragment added at the site becomes 40 which is 2 smaller than 42 using rounding down processing, in case that a low number and column number of the partial matrix fixed in a 3 divided errors $e_{1,2}$, $e_{2,2}$, $e_{3,3}$ become as follows, i.e., $e_{1,2}=e_{1,3}=e_{2,1}=e_{3,1}=(3\times42)/(3+3+3+4+4+3+4+5)=4$ $e_{2,2}=e_{2,3}=e_{3,2}=(4\times42)/(3+3+3+4+4+3+4+5)=5$ $e_{3,3}=(5\times42)/(3+3+3+4+4+3+4+5)=7$ As the result, the sum of error fragment added at the site becomes 38 (that is sum of $4\times4+5\times3+7$) which is 2 smaller than sum of error fragment of the case in which the partial matrix is the matrix with 2 rows and 2 columns. From this, it can be understood that it is good to change the size of partial matrix corresponding to the size of error value to obtain high gradation reproducibility.

EXPERIMENTAL EXAMPLE 1 OF FOURTH INVENTION

Figure 25:
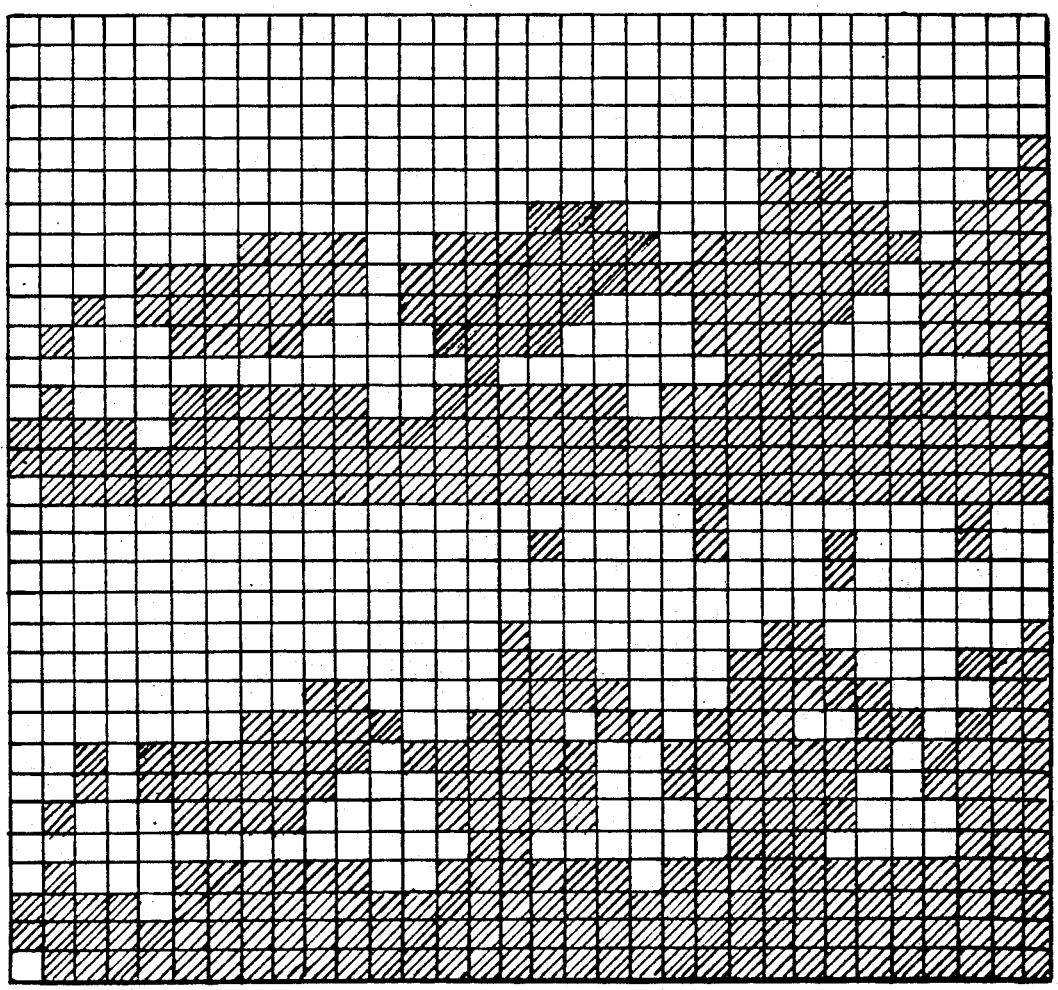
FIG. 25 is a diagram to show an output image according to the processing method of this invention.

With FIG. 10 as the multivalued information of the input taking the values within the range of 0–255, with the threshold at 255, with FIG. 11 as the diffusion coefficient matrix, with the size of the partial matrix determined corresponding to the size of the error value as shown in FIG. 26 and rotating angle of 0°, the binary image of FIG. 25 was obtained.

Figures 27, 28:
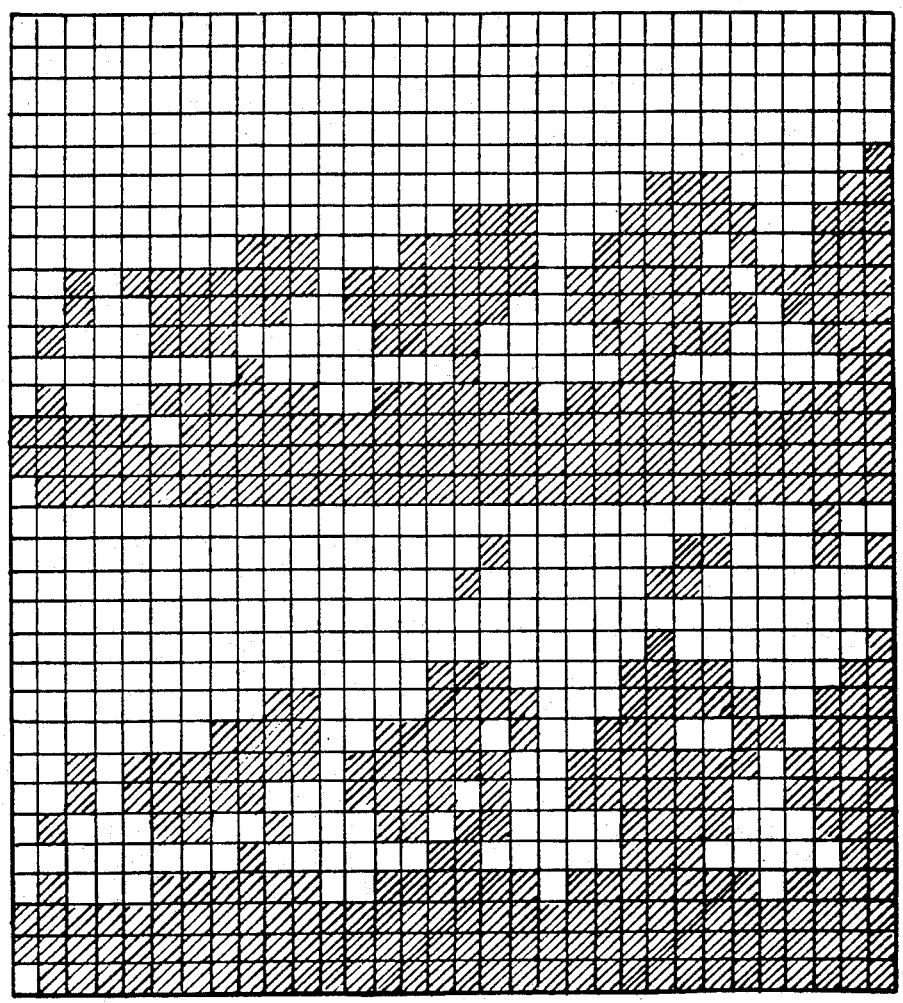
FIG. 27 is a diagram to show an output image according to the processing method of this invention.
FIG. 28 is a diagram of the diffusion coefficient matrix.

On the other hand, the binary image obtained in the same condition as above using a partial matrix of 4×4 is as shown in FIG. 27.

EXPERIMENTAL EXAMPLE 2 OF FOURTH INVENTION

With the gradation which is changed at 10% interval from 10% to 100% of the input, using the diffusion coefficient matrix of FIG. 28, the percentages (%) of the output dots of binary image in case that the partial matrix at fixed 4×4 is used and that the partial matrix that size is variable corresponding to the size of the error value are compared as shown in FIG. 29. It is evident in this FIG. 29 that better gradation reproducibility is obtainable by using the partial matrix which size is variable corresponding to the size to the error value.

Next, description is given on the fifth invention.

First, the diffusion coefficient matrix is described.

Figure 30:
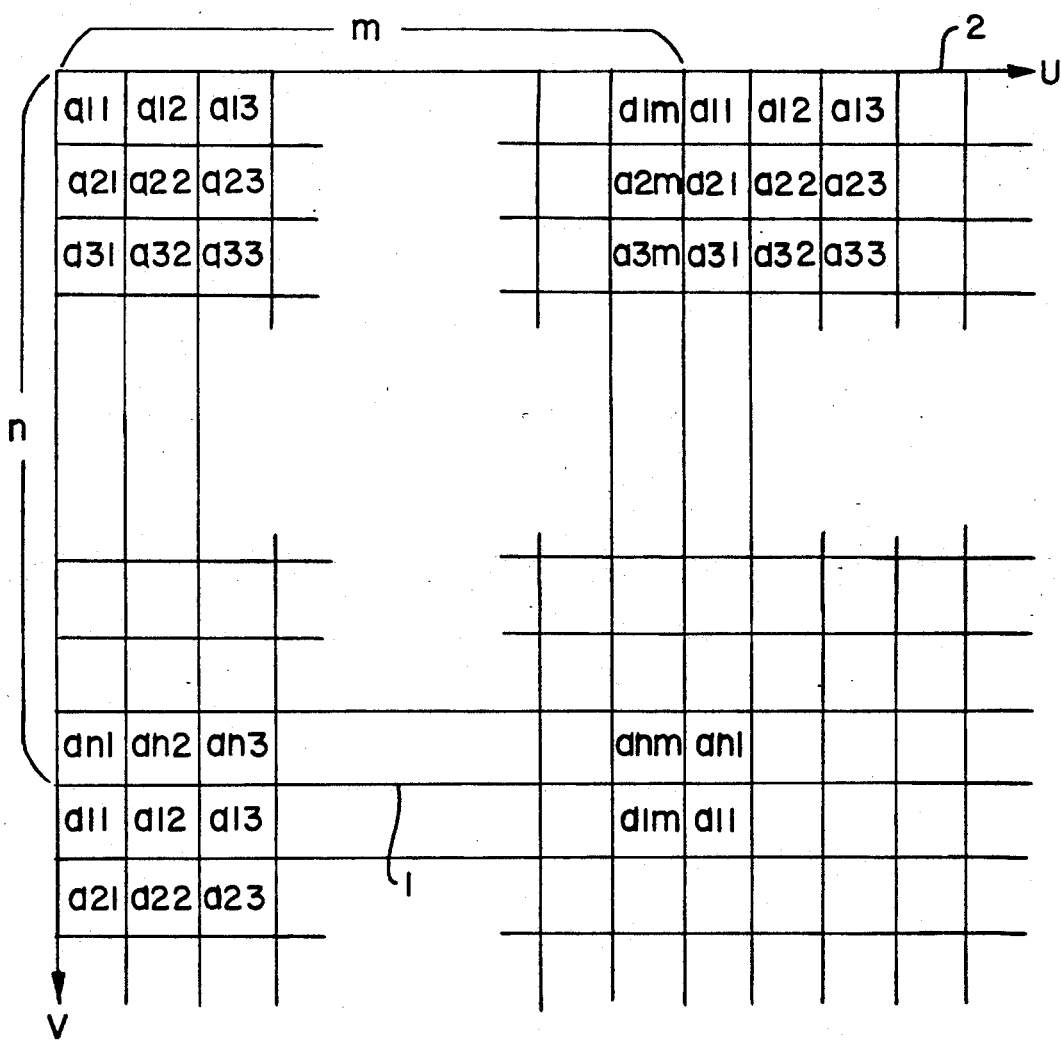
FIG. 30 is a diagram to show the diffusion coefficient matrix.

In FIG. 30, the numeral 2 represents the diffusion coefficient matrix, and the diffusion coefficient matrix 2 has the period with the length m in the direction of U-axis and the period with length n in the direction of V-axis. The coefficients $a_{1,1} \ldots a_{n,m}$ in the number of n·m are included in one 2-dimensional period. The elements in the diffusion coefficient matrix 2 fixedly correspond to each position of input pixel 7 in multivalued color image 4 (FIG. 31).

Figure 32:
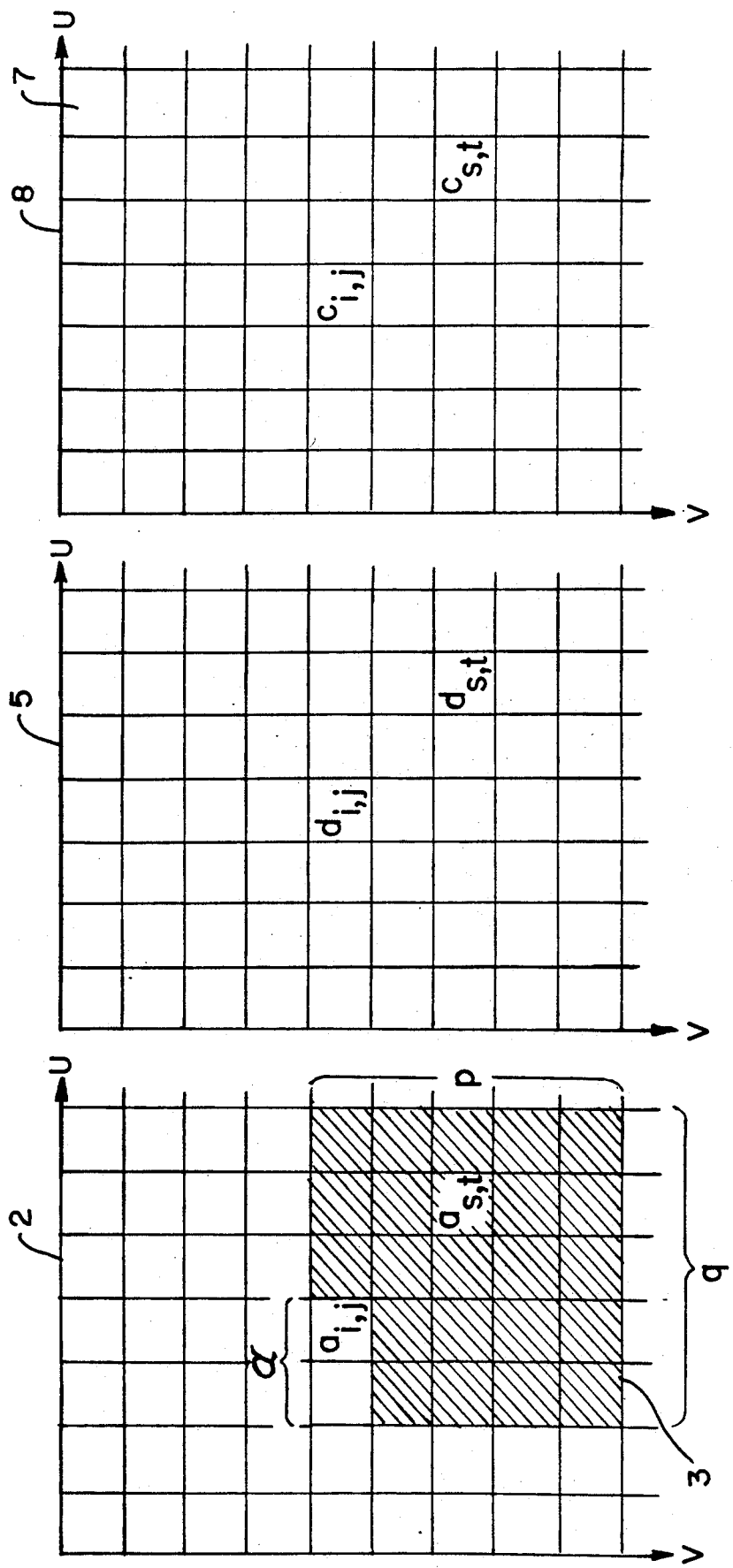
FIG. 32 is a diagram to show the positional relation between the diffusion coefficient matrix, error matrix and input value matrix and show partial matrix of the diffusion coefficient matrix.

Namely, 2 is a diffusion coefficient matrix in FIG. 32, and 3 represents partial matrix of p rows and q columns of the diffusion coefficient matrix 2. The element $a_{i,j}$ of the diffusion coefficient matrix 2 corresponds to the element $d_{i,j}$ of the matrix 8 of the input value in the inputted multivalued color image 4. Because the diffusion coefficient matrix 2 has periodicity, the value of $a_{i,j}$ is equal to the value of $a_{i \bmod m, j \bmod n}$. For example, if the periods m=4 and n=3, the value of $a_{3,2}$ is equal to the value of $a_{11,8}$ because $a_{11,8} = a_{11 \bmod 4, 8 \bmod 3} = a_{3,2}$.

Next, the error value matrix is described. The error value matrix 5 shown in FIG. 31 is a matrix that element is the error value that is the difference between the object value and the threshold value. The element $d_{i,j}$ of the matrix 5 of the error value matrix fixedly corresponds to each position of the input pixel 7 of the color image 4.

Figure 31:
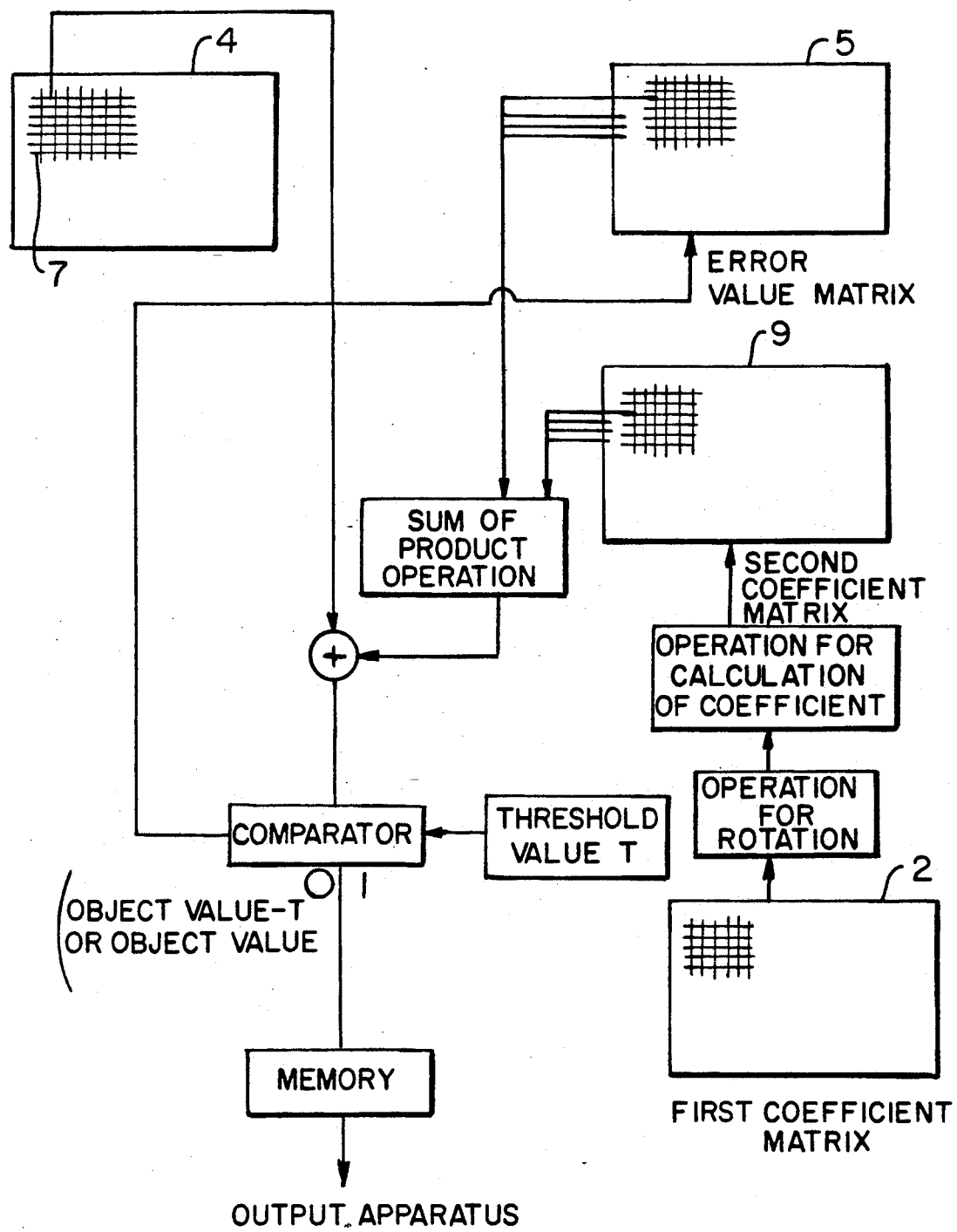
FIG. 31 is a diagram to explain the process of the image processing.

Next, to determine the ratio coefficient matrix 9 shown in FIG. 31, if U is the main scanning direction of the processing and V is the sub scanning direction and $C_{s,t}$ is the referred pixel, the element $e_{i,j}$ of the ratio coefficient matrix is obtained using formula (2). To obtain the object value, value obtained using formula (3) is added to input value $c_{s,t}$. To obtain the error value matrix 5 the object value is compared with some threshold value T.

$$g_{i,j} = \frac{a_{s,t}}{\sum_{z=j-\alpha+1}^{z=j-\alpha+q} \sum_{w=i}^{w=i+p-1} a_{w,z}} \quad \text{Formula (2)}$$

$(i \leq s \leq i + p - 1, j - \alpha + 1 \leq t \leq j - \alpha + q)$
(except $a_{i,k}$ with $k \leq j$)

$$\sum_{\zeta=t-q+\alpha+1}^{\zeta=t+\alpha} \sum_{\epsilon=s-p+1}^{\epsilon=s} g_{\epsilon,\zeta} \cdot c_{\epsilon,\zeta} \quad \text{Formula (3)}$$

(except $g_{\epsilon,\zeta} \cdot c_{\epsilon,\zeta}$ with $\epsilon = s, \zeta \geq t$)

In the case $c_{s,t} \geq T$, the binarized signal is turned to "to output" when the value of $c_{i,j}$ is binarized in comparison with the threshold T. Thus, the error of $e = c_{s,t} - T$ is generated. In case $c_{s,t} < T$, the binarized signal is to "not to output", and the error $e = c_{s,t}$ is generated. This error is stored as a value of element $d_{s,t}$ of the error matrix 5.

By performing this processing to all input pixels by moving the referred pixel in the order of main scanning and the sub scanning, the image in binary values can be obtained. There is no specific relation between p, q and n, m.

Figure 33:
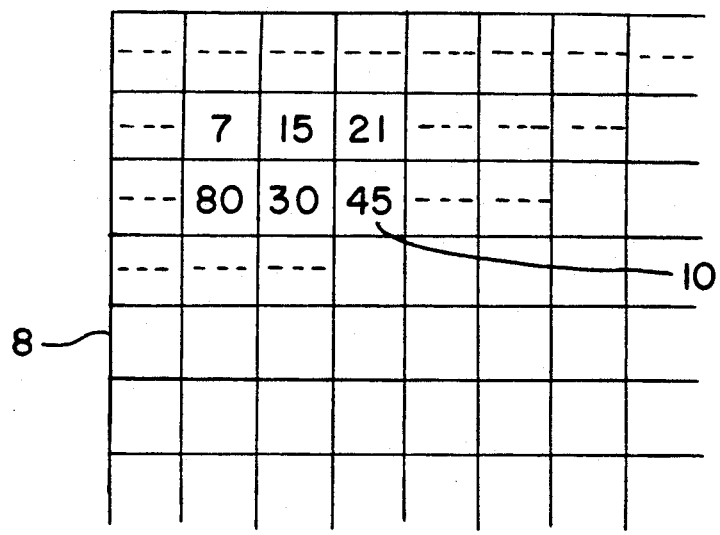
FIG. 33 is a diagram of an example of an input value matrix.
Figure 34:
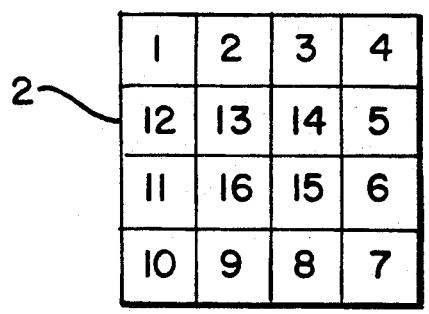
FIG. 34 shows another example of the diffusion coefficient matrix.
Figure 35:
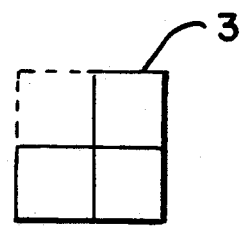
FIG. 35 shows partial matrix of the diffusion coefficient matrix.
Figure 36:
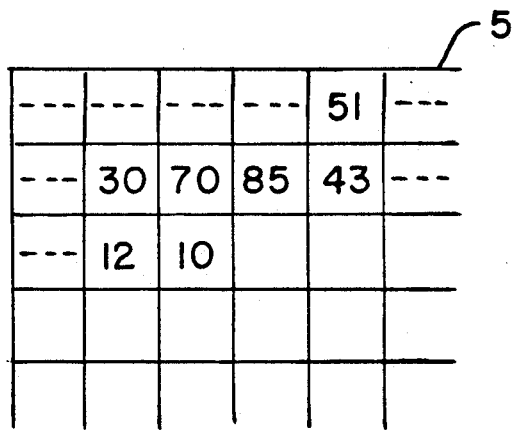
FIG. 36 is a diagram to show the error value matrix.
Figure 37:
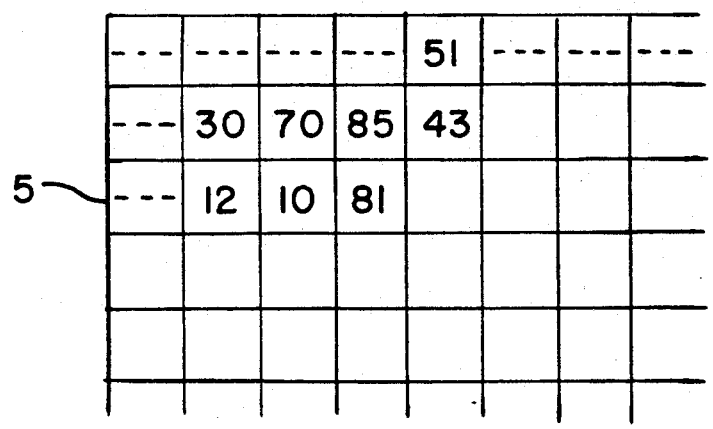
FIG. 37 is a diagram to show the error value matrix to which new error is stored.
Figure 42:
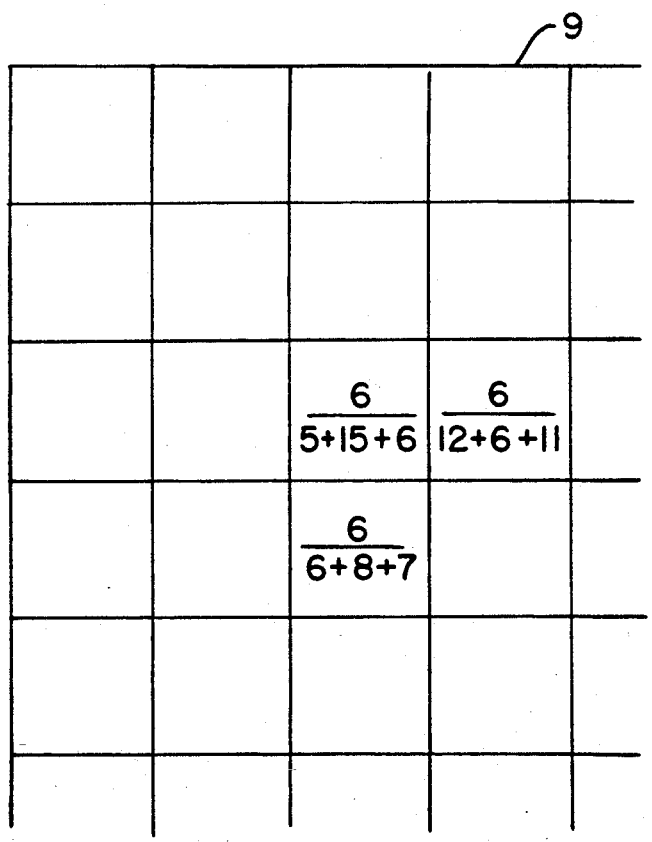
FIG. 42 is a diagram of the ratio coefficient matrix.

Next, the process to diffuse the error by the above processing is described in connection with the diagrams as an example. However, the claims of the present invention are not limited to the size of the matrix and numerical values used in this description. In FIG. 33, 8 represents the matrix of input value of inputted multivalued color image, and the numeral 10 denotes the site where process is performed (referred pixel). As shown in FIG. 34, it is supposed that the diffusion coefficient matrix 2 is a coefficient matrix of 4 rows and 4 columns, and the partial matrix 3 is the matrix with 2 rows and 2 columns as shown in FIG. 35. In this case p=q=2, $\alpha=1$ in formula (3). It is supposed that numeral 5 shown in FIG. 36 denotes the error value matrix. It is supposed that the range of the input pixel value is 0–100, and that the threshold is 100. The value of the object pixel value is 45 and the ratio coefficient matrix 9 shown FIG. 42 is derived from the diffusion coefficient matrix 2. Because calculation and result is $\{6/(5+70+6)\} \times 15 + \{6/(12+6+11)\} \times 85 + \{6/(6+8+7)\} \times 10 = 36.59$, the object value becomes $45 + 36 = 81$ and is smaller than the threshold. Thus, the binarized signal is turned to "not to output", the error is 81. As the result, the error value matrix become as given in FIG. 37. The same processing is performed to all input pixels by moving the referred pixel in the order of main scanning and the sub scanning, and the processing for one frame is completed.

Next, description is given on the sixth invention.

Figure 38:
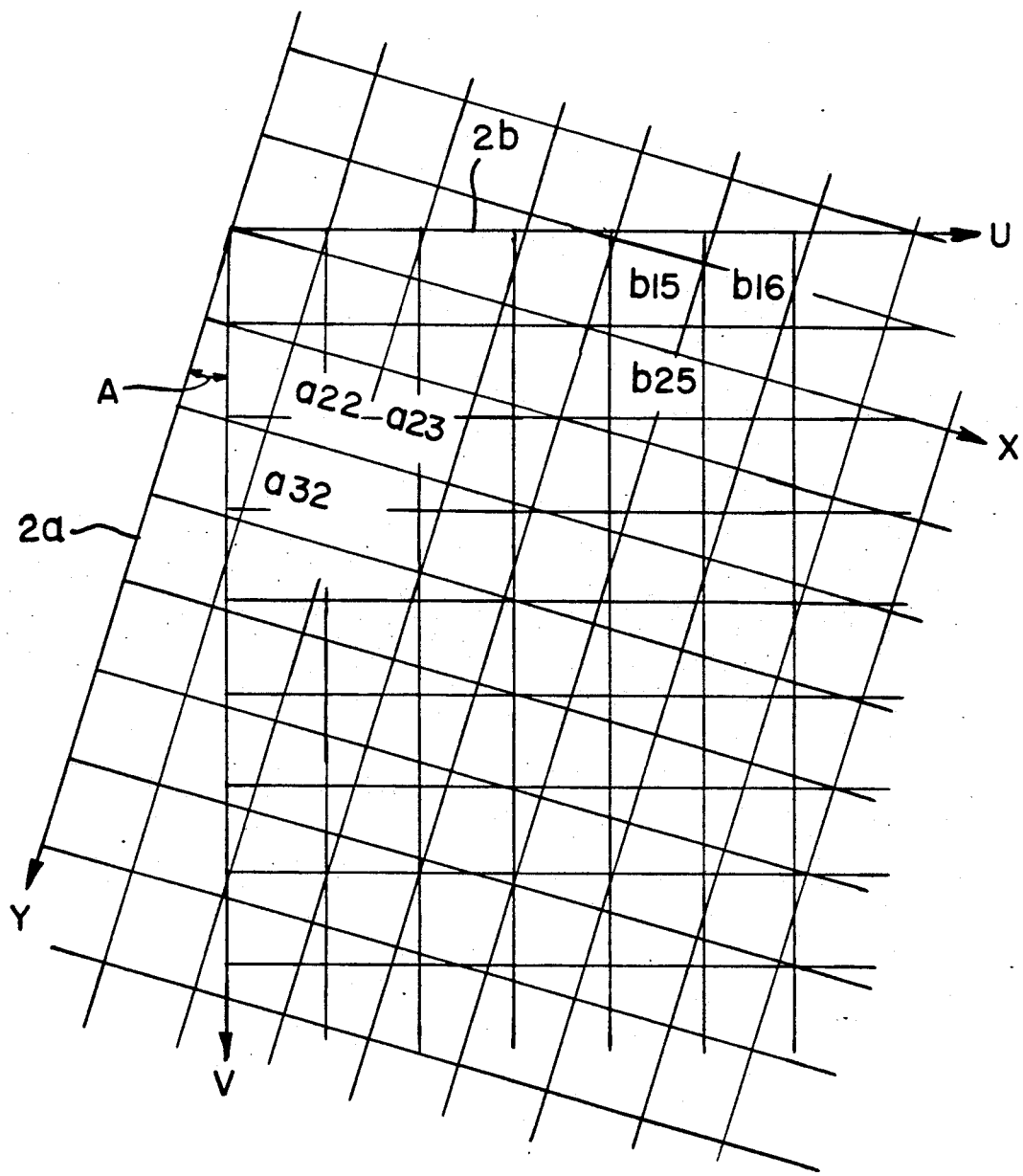
FIG. 38 is a diagram of the rotated diffusion coefficient matrix.

In FIG. 38, the diffusion coefficient matrix 2a is obtained by rotating said diffusion coefficient matrix 2 by the angle A, and 2b represents the diffusion coefficient matrix having the element $b_{i,j}$ corresponding to the element $c_{i,j}$ of the matrix 8 of the input value of multivalued input pixel of the color image. The value of $b_{i,j}$ is equal to the value of $a_{r,l}$, and the following relationship exists:

$r = [i \cdot \cos(A) - j \cdot \sin(A)] \bmod m.$ $l = [i \cdot \sin(A) + j \cdot \cos(A)] \bmod n.$ Here, [ ] indicates rounding process.

When the same processing as in the description of the fifth invention is performed using the diffusion coefficient matrix $2b$ rotating at different angles for each color instead of the diffusion coefficient matrix 2, the image in binary values with less moiré and color difference due to the registering miss at an output can be obtained.

Next, the seventh invention is described.

It is possible to accelerate binarization by memorising the ratio coefficient matrix rotated in the same manner as the sixth invention previously in a memory in advance of binarization.

Figure 43:
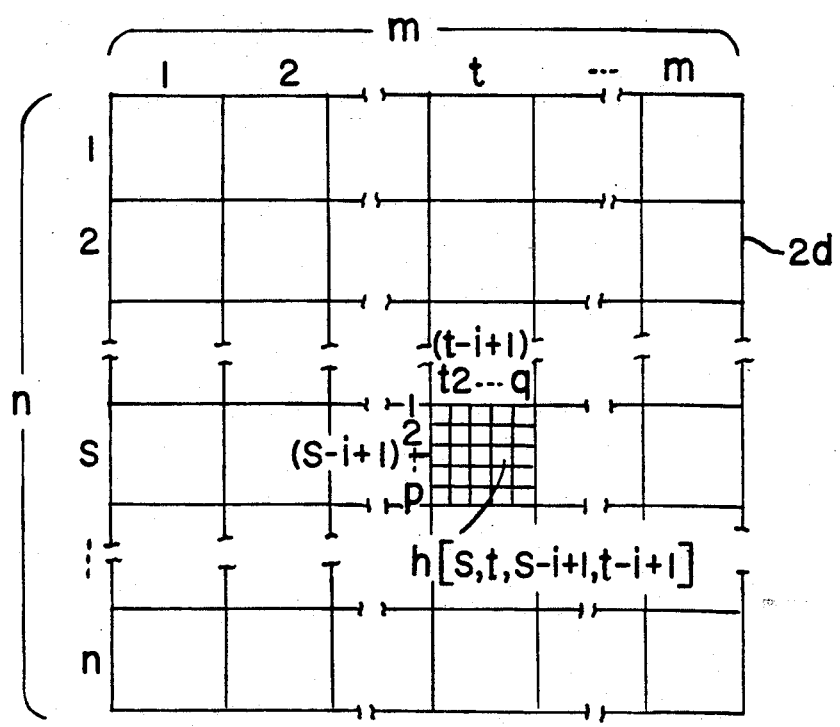
FIG. 43 is a diagram of the ratio coefficient matrix determined before binarization.

In this case, four dimension matrix $2d$ of $n \times m \times p \times q$ as conceptionaly shown in FIG. 43 stored in memory is prepared for the ratio coefficient matrix. When it is supposed that the h is element of said matrix, the size of the element $h_{s, t, s-i+1, t-j+1}$ is derived from formula (4) and is used as a coefficient multiplied to error value $d_{i,j}$ for processing input value $c_{s,t}$ of multivalued input pixel of the color image.

$$\frac{a_{s,t}}{\sum_{z=j-\alpha+1}^{z=j-\alpha+q} \sum_{w=i}^{w=i+p-1} a_{w,z}} \quad \text{Formula (4)}$$

$(i \leq s \leq i + p - 1, j - \alpha + 1 \leq t \leq j - \alpha + q)$
(except $a_{i,k}$ with $k \leq j$)

Particularly, the rotated ratio coefficient matrix that can be repeated seamlessly and can be formed by selecting $\theta$ than $\tan \theta = \delta/\gamma$ (rational number) and the value of can be formed by selecting $\theta$ such that $\tan \theta = \delta/\gamma$ (rational number) and the value of $\sqrt{\delta^2 30 \gamma^2} \cdot f$ belongs to an integer number or a near integer number. This ratio coefficient matrix can result in the reduction of a storage region in a memory. f is least common multiple number of element number n and m of vertical and horizontal axis of the diffusion coefficient matrix.

In FIG. 19, $2c$ designates a unit of $n \times n$ diffusion coefficient matrix and $2d$ designates the diffusion coefficient matrix rotated in angle $\theta$ that $\tan \theta = \frac{3}{4}$ as an example.

The rotated diffusion coefficient matrix has $\sqrt{3^2 + 4^2} n = 5n$ elements in each side and can be repeated in vertical and horizontal direction.

EXPERIMENTAL EXAMPLES

In the following, the method according to this invention will be described in connection with experimental examples, whereas the present invention is not limited to the numeral values in the experimental examples.

EXPERIMENTAL EXAMPLE 1 OF THE SIXTH INVENTION

Figure 40:
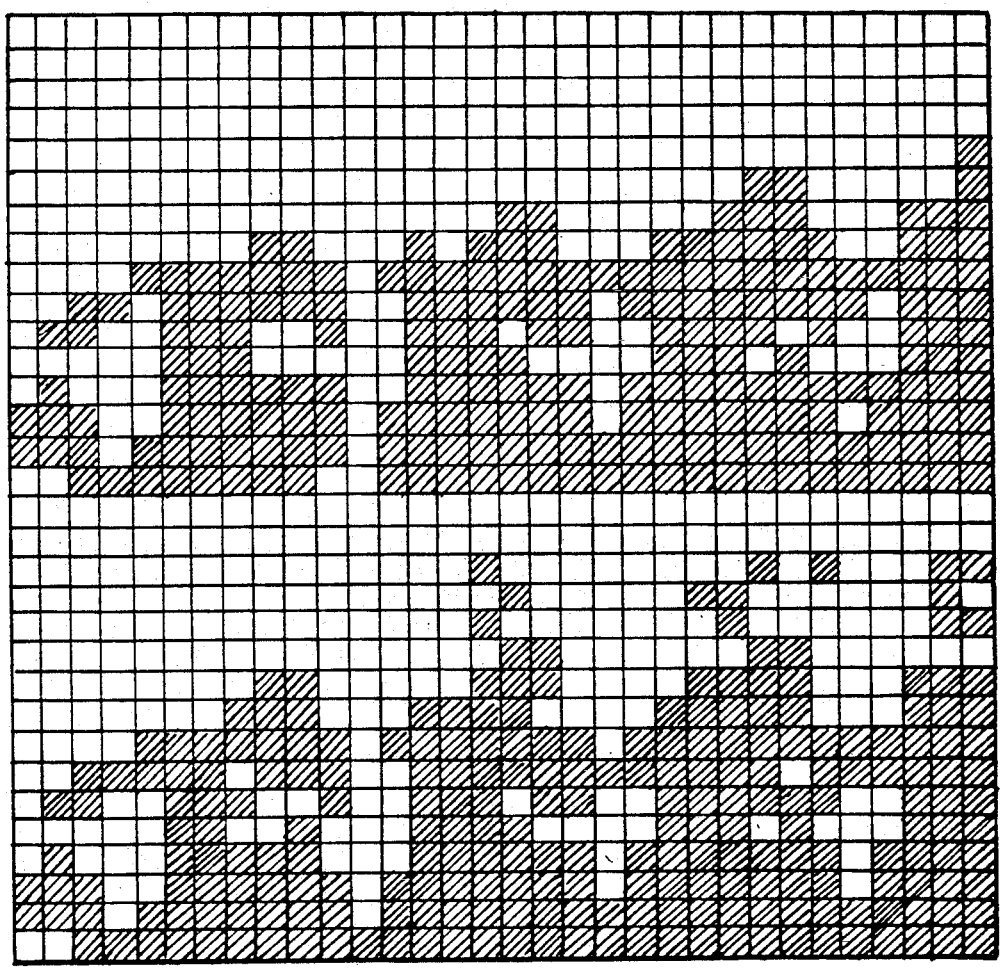
FIG. 40 is a diagram to show output image according to the processing method of this invention.

With FIG. 10 as the multivalued information of the input taking the values within the range of 0-255, with the threshold at 255, with FIG. 39 as the diffusion coefficient matrix, with the size of partial matrix at $4 \times 4$ and rotating angle of 0°, the binary image of FIG. 40 was obtained.

On the other hand, the image was reproduced through binarization according to the error diffusion method, using the same input data and the diffusion coefficient table of FIG. 13. The result is given in FIG. 14. As it is evident from the figure, the shape similar to dots can be obtained by the method of this invention.

EXPERIMENTAL EXAMPLE 2 OF THE SIXTH INVENTION

Figure 41:
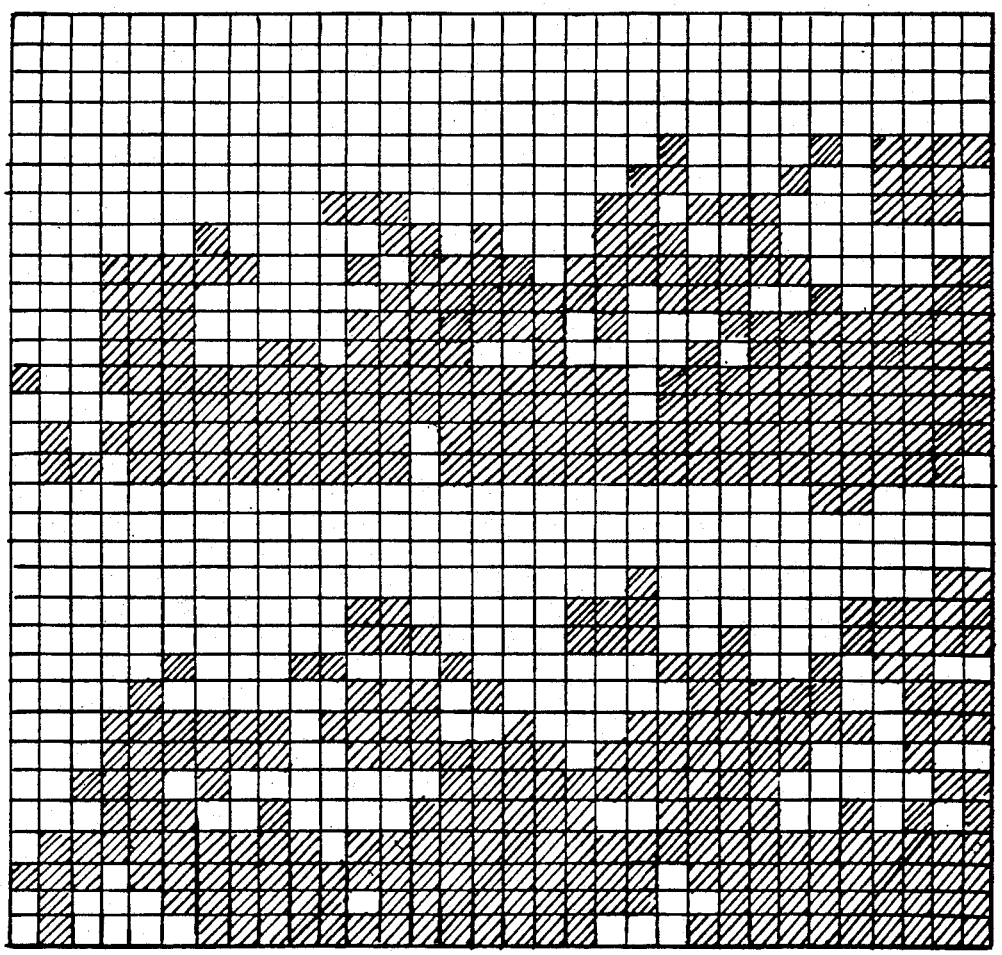
FIG. 41 is an output diagram to represent another output image according to this invention.

With FIG. 10 as the multivalued information of the input taking the values within the range of 0-255, with the threshold as 255, with FIG. 39 as diffusion coefficient matrix, with the size of the partial matrix as $4 \times 4$ and rotating angle of 30°, the binary image of FIG. 41 was obtained. It is also evident in this figure that the shape similar to dots can be obtained.

EXPERIMENTAL EXAMPLE OF THE SIXTH INVENTION

A transparent original was inputted using a scanner for prepress (Dainippon Screen Co., Ltd.,; SG-818), and the binarization processing was performed by personal computer PC-9801 (NEC). The binary value image was outputted on four black-and-white films by a laser plotter (Scitex), and color image was reproduced by a proof press (DuPont). The results were approximately the same as that of the conventional type printing. In this case, the diffusion coefficient matrix was the same as given in FIG. 39, and the size of partial matrix was $4 \times 4$. The diffusion coefficient matrix was rotated by the angle of FIG. 16 for each color.

As the result, a binary value image with less moiré and color difference due to registering miss was obtained.

EFFECTIVE ADVANTAGES OF THE INVENTION

It is possible according to the present invention to obtain a method for color image information processing, which can provide high tone reproducibility and to give the processed image with excellent image quality without using threshold table.

In case that the 2-dimensional diffusion coefficient matrix having a period n·m of this invention is formed into pyramid shape, where the values in central part is larger than those in the surrounding as given in FIG. 17, the binary value image like dots having the period similar to that of conventional type printing process using contact screen could be obtained. With the coefficient like roof as given in FIG. 18 the effect similar to that of the printing using single-lined screen was obtained, and both moiré and color difference were extremely decreased.

What we claim is:

1. A method for color image information processing to reproduce multivalued color halftone image information by use of an output device capable of recording in binary values, comprising the steps of:
   preparing a diffusion coefficient matrix with periodicity in a 1- or 2-dimensional direction, and storing said diffusion coefficient matrix in a memory;
   binarizing by use of a comparator, an object value that is a density value of a referred input pixel of a color image or the sum of density value and error values, by comparison with a threshold, said comparator being operative to compare said object value with the threshold;
   employing an arithmetic logic unit to accomplish a dividing of a difference between said object value and the threshold into error values in a size proportional to the coefficients as elements in the partial matrix by use of said partial matrix, said partial matrix being part of said diffusion coefficient matrix, said periodicity in 1-dimensional or 2-dimensional direction consisting of the elements fixedly corresponding to each position of the input pixel;

providing correspondence between the position of said partial matrix and a position of said referred input pixel; and adding said error values to the object values of the input pixels that correspond to the elements of said partial matrix of the diffusion coefficient matrix.

2. A color image information processing method according to claim 1, further comprising a step of
   rotating said diffusion coefficient matrix at a different angle for each color of said image information.

3. A color image information processing method according to claim 2, further comprising a step of
   storing said diffusion coefficient matrix after said step of rotating at a different angle for each color in a memory.

4. A color image information processing method for an object value characterized as a density value of a referred input pixel of a color image or the sum of a density value and error values, comprising the steps of:
   preparing a diffusion coefficient matrix with periodicity in a 1- or 2-dimensional direction, and storing said diffusion coefficient matrix in a memory;
   binarizing, by use of a comparator, the density value by comparison with a threshold to obtain a difference between said object value and the threshold, said comparator being operative to compare said density value with the threshold;
   employing an arithmetic logic unit to accomplish a dividing of said difference between said object value and said threshold into said error values in a size proportional to the coefficients as elements in the partial matrix by use of said diffusion coefficient matrix, said periodicity in 1-dimensional or 2-dimensional direction consisting of the elements fixedly corresponding to each position of the input pixel;
   providing correspondence of the position of said partial matrix to the position of said referred input pixel;
   adding said error values to the object values of input pixels that correspond to the elements of said partial matrix of the diffusion coefficient matrix; and
   varying the size of rows and/or columns of said partial matrix corresponding to the size of said difference.

5. A color image information processing method to reproduce multivalued color image information by an output device capable of recording in binary values, comprising the steps of
   representing an object value as a density value of referred input pixels of a color image or the sum of a density value and sum of products of the values of elements of an error value matrix and the values of elements of a ratio coefficient matrix, the positions of said elements of the error value matrix corresponding to the position surrounding an element of referred input pixel;
   providing correspondence between elements of the error value matrix and positions of the input pixels;
   calculating, by means of an arithmetic logic unit, coefficients which are elements of a ratio coefficient matrix from a diffusion coefficient matrix having periodicity in 1-dimensional or 2-dimensional direction consisting of the elements corresponding to positions of the input pixel, and storing said coefficients in a memory;
   wherein said step of representing includes binarizing the object value by comparison with a threshold, said binarizing step being accomplished by a comparator responsive to the threshold; and
   the method further comprises forming and storing a difference between said object value and the threshold as an element of the error value matrix corresponding to positions of said referred input pixels; and
   dividing said difference by a coefficient of said ratio coefficient matrix.

6. A color image information processing method according to claim 5, further comprising
   rotating said diffusion coefficient matrix at a different angle for each color.

7. A color image information processing method according to claim 6, further comprising the step of
   storing said ratio coefficient matrix rotated at a different angle for each color in a memory.

8. A color image information processing method according to claim 6, further comprising
   rotating said ratio coefficient matrix calculated from the diffusion coefficient matrix at a different angle for each color; and
   storing said ratio coefficient matrix in a memory.

9. A method for binarizing color images to reproduce multivalued color halftone image information from an output device capable of recording in binary values, comprising the steps of:
   (a) preparing an input image having pixels which are arranged in 2-dimensional matrix in a memory;
   (b) preparing a diffusion coefficient matrix with periodicity in a 1- or 2-dimensional direction in the memory, each position of an element of said diffusion coefficient matrix corresponding fixedly to a position of an input pixel of said input image;
   (c) binarizing by comparing the threshold value and an object value by a comparison means, the object value being the density value of an input pixel of said input image or the sum of said density value and an error value;
   (d) dividing a difference between said object value and said threshold value into said error value in a size proportional to the elements of a partial matrix of said diffusion coefficient matrix by a dividing means, a position of said partial matrix corresponding fixedly to the position of said input pixel;
   (e) adding said error value to said input pixel of said input image by an adding means, each position of an element of said error value and an element of said input pixel corresponding to each position of the element of said partial matrix of said diffusion coefficient matrix; and
   (f) repeating steps (c) to (e) moving a designated input pixel line-by-line and pixel-to-pixel.

10. A color image binarizing method according to claim 9, further comprising
    rotating said diffusion coefficent matrix at a different angle for each of a plurality of colors of said color images.

11. A color image binarizing method according to claim 10, further comprising a step of
    storing said diffusion coefficient matrix rotated at a different angle for each color in a computer memory device.

12. A method for binarizing color images of which an object value is characterized as a density value of a referred input pixel of a color image or the sum of a density value and error values, the method serving to reproduce multivalued color halftone image information from an output device capable of recording in binary values, the method comprising the steps of:

(a) preparing an input image having pixels arranged in 2-dimensional matrix in a computer memory device;

(b) preparing a diffusion coefficient matrix with periodicity in a 1- or 2-dimensional direction in a computer memory device, each position of the element of said diffusion coefficient matrix corresponding fixedly to respective positions of said input pixels of said input image;

(c) binarizing the density value by comparing a threshold value and an object value that is the density value of the referred input pixel of said input image or the sum of said density value and an error value, by a comparing means;

(d) dividing a difference between said input pixel of said input image; threshold value and said object value into error values in a size proportional to the elements of a partial matrix of said diffusion coefficient matrix by a dividing means, the position of said partial matrix corresponding fixedly to the position of said referred input pixel, the size of rows or/and columns of said partial matrix varying according to the size of said difference;

(e) adding said error values to said input pixels of said input image by an adding means, each position of the element of said error value and the element of said input pixel corresponding to each position of the element of said partial matrix of said diffusion coefficient matrix; and (f) repeating steps (c) to (e) moving the referred input pixel line-by-line and pixel-by-pixel.

13. A method for binarizing color images to reproduce multivalued color halftone image information from an output device capable of recording in binary values, comprising the steps of:

(a) preparing an input image whose pixels are arranged in a 2-dimensional matrix in a computer memory device;

(b) preparing a ratio coefficient matrix calculated from a diffusion coefficient matrix having periodicity in a 1- or 2-dimensional direction, in a computer memory device, each position of an element of said diffusion coefficient matrix corresponding fixedly to each position of said input pixel of said input image;

(c) preparing an error value matrix in a computer memory device, each position of an element of said error value matrix corresponding to each position of said input pixel of said input image;

(d) calculating an object value by adding the sum of the products of error values of the elements stored around the position corresponding to a referred input pixel already in said error value matrix, and ratio values of a ratio value matrix corresponding to said error values, to said referred input pixel by calculating means;

(e) binarizing by comparing a threshold value and an object value by a comparing means;

(f) storing a difference between said threshold value and said object value in the said error value matrix by the computer, the position of the element of said error value matrix fixedly corresponding to the position of said referred input pixel of the said input image; and (g) repeating steps (d) to (f) moving the referred input pixel line-by-line and pixel-to-pixel.

14. A color image binarizing method according to claim 13, further comprising a step of
rotating said diffusion coefficient matrix at a different angle for each of a plurality of colors of said color images.

15. A color image binarizing method according to claim 14, further comprising a step of storing in a computer memory device said ratio coefficient matrix calculated from said diffusion coefficient matrix for various angles of rotation corresponding to each color.

* * * * *

UNITED STATES PATENT AND TRADEMARK OFFICE
CERTIFICATE OF CORRECTION

PATENT NO. : 5,184,213

DATED : February 2, 1993

INVENTOR(S) : ROH ISHIDA

It is certified that error appears in the above-indentified patent and that said Letters Patent is hereby corrected as shown below:

Column 6, line 12    change "$a_{1,2}$" to --$e_{1,2}$--

Column 11 line 31    change "than" to --that--

Column 11 line 33    change "$\sqrt{\delta^2 30\gamma^2} \cdot f$" to --$\sqrt{\delta^2 + \gamma^2} \cdot f$--

Signed and Sealed this

Twenty-first Day of June, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,184,213
DATED : Feb. 2, 1993
INVENTOR(S) : Roh Ishida

It is certified that error appears in the above-indentified patent and that said Letters Patent is hereby corrected as shown below:

Column 6, line 12 change "$c_{2,1}$" to --$e_{2,1}$--

Column 11 line 32    delete this line (since it is a duplicate of the preceding line)

Signed and Sealed this

Sixth Day of September, 1994

*Attest:*

BRUCE LEHMAN

*Attesting Officer*      *Commissioner of Patents and Trademarks*